(12) United States Patent
Lee et al.

(10) Patent No.: US 7,662,317 B2
(45) Date of Patent: *Feb. 16, 2010

(54) DISPERSANT, PASTE COMPOSITION INCLUDING THE DISPERSANT, INORGANIC DEVICE USING THE PASTE COMPOSITION, AND DISPLAY APPARATUS INCLUDING THE INORGANIC DEVICE

(75) Inventors: Eun-sung Lee, Seoul (KR); Jae-young Chol, Suwon-si (KR); Seul-ki Kim, Goyang-si (KR); Seon-mi Yoon, Yongin-si (KR); Nam-seok Baik, Suwon-si (KR); Sung-gi Yoon, Cheonan-si (KR); Don-ik Lee, Icheon-si (KR)

(73) Assignee: Samsung Electronics Co., Ltd. (KR)

( * ) Notice: Subject to any disclaimer, the term of this patent is extended or adjusted under 35 U.S.C. 154(b) by 447 days.

This patent is subject to a terminal disclaimer.

(21) Appl. No.: 11/480,186

(22) Filed: Jun. 30, 2006

(65) Prior Publication Data

US 2007/0157852 A1 Jul. 12, 2007

(30) Foreign Application Priority Data

Jun. 30, 2005 (KR) ............... 10-2005-0058638
Dec. 30, 2005 (KR) ............... 10-2005-0135838

(51) Int. Cl.
*H01B 1/20* (2006.01)
*C09K 11/02* (2006.01)
*G02F 1/1335* (2006.01)

(52) U.S. Cl. ............. 252/519.5; 252/520.1; 252/520.2; 252/520.5; 252/521.1; 252/518.1; 252/301.36; 349/69

(58) Field of Classification Search ............ 252/519.5, 252/520.1, 520.2, 520.5, 521.1, 518.1, 301.36, 252/301.6 F; 349/69

See application file for complete search history.

(56) References Cited

U.S. PATENT DOCUMENTS

| 3,758,409 A * | 9/1973 | Nakagawa et al. ......... 510/370 |
| 4,071,468 A * | 1/1978 | Abel et al. .................. 516/123 |
| 4,092,266 A * | 5/1978 | Abel et al. .................. 516/123 |
| 4,405,413 A * | 9/1983 | Skimin ....................... 205/314 |
| 4,490,960 A * | 1/1985 | Klemesrud ................. 53/138.1 |
| 4,507,906 A * | 4/1985 | Meyer ........................ 53/375.5 |
| 4,607,121 A * | 8/1986 | Faggian et al. ............. 562/537 |
| 5,162,069 A * | 11/1992 | Morris ....................... 156/363 |
| 5,306,375 A * | 4/1994 | Leonard .................... 156/249 |
| 5,952,036 A * | 9/1999 | Tadaki et al. ............... 427/64 |
| 6,439,943 B1 * | 8/2002 | Aoki et al. .................. 445/24 |
| 6,773,628 B2 * | 8/2004 | Kinno .................. 252/301.36 |
| 6,794,821 B2 * | 9/2004 | Juestel et al. .............. 313/587 |
| 7,170,222 B2 * | 1/2007 | Choi et al. ................. 313/486 |
| 7,358,668 B2 * | 4/2008 | Kwon ........................ 313/582 |
| 7,429,340 B2 * | 9/2008 | Kwon ................... 252/301.36 |
| 2003/0151032 A1 * | 8/2003 | Ito et al. ..................... 252/570 |
| 2004/0099847 A1 * | 5/2004 | Miura ........................ 252/500 |
| 2006/0076879 A1 * | 4/2006 | Kwon ........................ 313/485 |
| 2007/0072969 A1 * | 3/2007 | Lee et al. ................... 524/113 |
| 2007/0102676 A1 * | 5/2007 | Lee et al. ................... 252/500 |
| 2007/0157852 A1 * | 7/2007 | Lee et al. ................... 106/278 |

FOREIGN PATENT DOCUMENTS

| JP | 2000-203887 | 7/2000 |
| KR | 1020010037347 A | 5/2001 |
| KR | 1020030033654 A | 5/2003 |

OTHER PUBLICATIONS

Reg. No. 38142-12-0, Nov. 16, 1984.*
Reg. No. 87973-11-3, Nov. 16, 1984.*
Reg. No. 121057-09-8, Jun. 9, 1989.*

* cited by examiner

*Primary Examiner*—Douglas Mc Ginty
(74) *Attorney, Agent, or Firm*—Cantor Colburn LLP

(57) ABSTRACT

Provided is a dispersant including a hydrophobic moiety with a branched alkyl group and an arylene group and a hydrophilic moiety with an alkylene oxide group and a carboxylic acid group. The alkyl group is a substituted or unsubstituted alkyl group of 5-30 carbon atoms, the arylene group is a substituted or unsubstituted arylene group of 6-30 carbon atoms, and the alkylene oxide group is a substituted or unsubstituted alkylene oxide group of 2-10 carbon atoms. The dispersant has good dispersibility, and a low residual carbon content after sintering. Thus, a paste composition including the dispersant can maintain a low viscosity and disperse many inorganic particles. Thus, an inorganic device prepared using the paste composition can have a low residual carbon content and a high packing density.

22 Claims, 12 Drawing Sheets

DISPERSANT, PASTE COMPOSITION INCLUDING THE DISPERSANT, INORGANIC DEVICE USING THE PASTE COMPOSITION, AND DISPLAY APPARATUS INCLUDING THE INORGANIC DEVICE

CROSS-REFERENCE TO RELATED PATENT APPLICATION

This application claims priority to Korean Patent Application No. 10-2005-0058638, filed on Jun. 30, 2005, and Korean Patent Application No. 10-2005-0135838, filed on Dec. 30, 2005, and all the benefits accruing therefrom under 35 U.S.C. §119, and the contents of which are incorporated herein by reference in their entirety.

FIELD OF THE INVENTION

The present invention relates to a dispersant, a paste composition including the dispersant, an inorganic device made of the paste composition, and a display apparatus including the inorganic device. More particularly, the present invention relates to a dispersant with good dispersibility and low residual carbon content, a paste composition including the dispersant, an inorganic device prepared using the paste composition, and a display apparatus including the inorganic device.

DESCRIPTION OF THE RELATED ART

Display devices, which are major elements of information delivery systems, are mainly used as Personal Computer ("PC") monitors, television receivers, etc. Display devices can be largely classified into Cathode Ray Tubes ("CRTs") using high-speed electrons emitted from cathodes, and recently rapidly developed flat panel displays, such as Liquid Crystal Displays ("LCDs"), Plasma Display Panels ("PDPs"), Field Emission Displays ("FEDs"), or Carbon Nano Tube ("CNT")-based lamps.

Among the flat panel displays, the PDPs are display devices that, when voltages are applied to transparent electrodes and a discharge occurs on a dielectric surface and a protective surface to generate UV light, phosphors coated on a rear panel are excited by the UV light, thereby emitting light. The FEDs and CNT-based lamps are display devices that, when a strong electric field from a gate electrode is applied to emitters arranged in a predetermined distance on a cathode, electrons are emitted from the emitters and then collide with phosphors coated on the surface of an anode, thereby emitting light.

These flat panel displays are different in operational principle as described above, but a constituent element (e.g., a phosphor layer, etc.) disposed between two panels of a flat panel display is generally formed by coating a paste composition on a substrate during display fabrication. Various components constituting the paste composition must be uniformly dispersed in the paste composition and must not be easily precipitated. By doing so, even when the paste composition is subjected to subsequent processes (e.g., sintering), display devices with uniform properties can be produced. These requirements are needed not only for the flat panel displays but also many other display devices used in the electronic field. If the dispersibility of a paste composition is poor, it is difficult to accomplish electrical or magnetic uniformity after a curing process such as sintering.

Thus, a dispersant is generally added to a paste composition in order to enhance the dispersibility of the paste composition. For example, the use of a dispersant in a paste composition for barrier ribs of PDPs is disclosed in the technical literature, e.g., Korean Patent Laid-Open Publication Nos. 2001-0037347 and 2003-0033564, and Japanese Patent Laid-Open Publication No. 2000-203887. In particular, phosphate-based dispersants are known to have good dispersibility.

Generally, a dispersant-containing paste composition is subjected to a sintering process to provide the desired product. At this time, the dispersant is mostly vaporized but residual carbon is left after carbonization. If residual carbon is left on, for example, dielectrics of flat panel displays made of a dispersant-containing paste, it can appear as a dark spot under visible light, lowering the color purity and image quality of the flat panel displays. Furthermore, if residual carbon is left on barrier ribs for PDPs, discharging lifetime is reduced, thereby significantly lowering the performance of the PDPs. In this regard, a dispersant for a paste must have a low residual carbon content, in addition to good dispersibility.

In currently available dispersants, dispersibility is incompatible with low residual carbon content. That is, the better the dispersibility of a dispersant, the greater the residual carbon content. Thus, currently available dispersants have limited utility where low residual carbon content is desired. Therefore, the development of dispersants with both good dispersibility and low residual carbon content is still required.

BRIEF SUMMARY OF THE INVENTION

An exemplary embodiment of the present invention provides a dispersant with good dispersibility and low residual carbon content.

An exemplary embodiment of the present invention also provides a paste composition including the dispersant.

An exemplary embodiment of the present invention also provides a display apparatus using the paste composition.

An exemplary embodiment of the present invention also provides a plasma display panel including barrier ribs made of the paste composition.

According to an exemplary embodiment of the present invention, there is provided a dispersant including: a hydrophobic moiety including a branched alkyl group and an arylene group; and a hydrophilic moiety including an alkylene oxide group and a carboxylic acid group, wherein the alkyl group is a substituted or unsubstituted alkyl group of 5-30 carbon atoms, the arylene group is a substituted or unsubstituted arylene group of 6-30 carbon atoms, and the alkylene oxide group is a substituted or unsubstituted alkylene oxide group of 2-10 carbon atoms.

The dispersant may be represented by Formula 1 below:

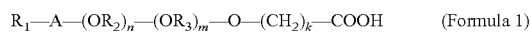

$$R_1—A—(OR_2)_n—(OR_3)_m—O—(CH_2)_k—COOH \qquad \text{(Formula 1)}$$

wherein, $R_1$ is a substituted or unsubstituted branched alkyl group of 5-30 carbon atoms;

A is a substituted or unsubstituted arylene group of 6-30 carbon atoms;

$R_2$ and $R_3$ are each independently a substituted or unsubstituted alkylene group of 2-5 carbon atoms;

k is 0 to 2; and n and m are each independently a real number of 0 to 30 with the proviso that $3 \leq n+m \leq 30$.

The dispersant may also be represented by Formula 2 below:

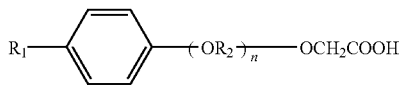
(Formula 2)

wherein $R_1$ is a substituted or unsubstituted branched alkyl group of 5 to 30 carbon atoms, $R_2$'s are each independently a substituted or unsubstituted alkylene group of 2 to 5 carbon atoms, and n is a real number of 0 to 30.

The dispersant may also be represented by Formula 3 below:

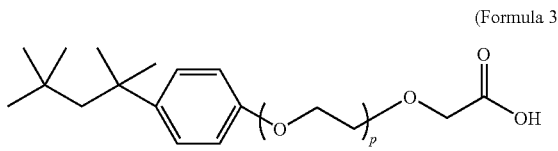
(Formula 3)

wherein p is 3 to 10.

According to another exemplary embodiment of the present invention, there is provided a paste composition including: inorganic particles; an organic solvent; and the above described dispersant.

The organic solvent may be at least one selected from the group consisting of terpineol, butyl carbitol, butyl carbitol acetate, pentene diol, dipentene, limonene, ethyleneglycol alkylether, diethyleneglycol alkylether, ethyleneglycol alkylether acetate, diethyleneglycol alkylether acetate, diethyleneglycol dialkylether acetate, triethyleneglycol alkylether acetate, triethyleneglycol alkylether, propyleneglycol alkylether, propyleneglycol phenylether, dipropyleneglycol alkylether, tripropyleneglycol alkylether, propyleneglycol alkylether acetate, dipropyleneglycol alkylether acetate, tripropyleneglycol alkylether acetate, dimethyl phthalate, diethyl phthalate, dibutyl phthalate, and distilled water.

The paste composition may include 24-80 parts by weight of the organic solvent and 0.5-3 parts by weight of the dispersant, based on 100 parts by weight of the inorganic particles.

The inorganic particles may be a glass powder, and the paste composition may further include an organic binder. In this case, the paste composition may also further include an additive.

The glass powder may be at least one selected from the group consisting of PbO, BaO, $SiO_2$, $B_2O_3$, $Al_2O_3$, ZnO, $Bi_2O_3$, MgO, $Na_2O$, $K_2O$, $TiO_2$, $ZrO_2$, CuO, and $SnO_2$.

The organic binder may be at least one selected from the group consisting of a cellulose resin, a butyral resin, polyethylene oxide, an acrylate resin, a vinyl resin, and polypropylene carbonate.

The paste composition may include 3-6 parts by weight of the organic binder, 21-74 parts by weight of the organic solvent, and 0.5-3.0 parts by weight of the dispersant, based on 100 parts by weight of the glass powder. In this case, the paste composition may further include 0.1-3 parts by weight of the additive based on 100 parts by weight of the glass powder.

The paste composition may have a viscosity of 10,000 to 60,000 cps at a temperature of 25° C. and at a shear rate of 1 $sec^{-1}$.

The inorganic particles may be phosphor particles, and the paste composition may further include an organic binder. In this case, the paste composition may also further include an additive.

The phosphor particles may be at least one selected from the group consisting of $YBO_3:Tb^{3+}$, $BaMg_{10}Al_{17}:Eu$, $YGdBO_3:Eu$, and $Zn_2SiO_4:Mn$.

The paste composition may include 3-6 parts by weight of the organic binder, 21-74 parts by weight of the organic solvent, and 0.5-3 parts by weight of the dispersant, based on 100 parts by weight of the phosphor particles. In this case, the paste composition may further include 0.1-3 parts by weight of the additive based on 100 parts by weight of the phosphor particles.

According to still another exemplary embodiment of the present invention, there is provided a display apparatus using the paste composition.

The display apparatus may be a plasma display panel.

The display apparatus may be a field emission display.

According to a further exemplary embodiment of the present invention, there is provided a plasma display panel including barrier ribs made of the paste composition.

According to another exemplary embodiment of the present invention, there is provided a method of preparing a sintered product by sintering the paste composition at a temperature of greater than 500° C. The sintered product prepared thereby has low residual carbon content of less than 2 weight percent. An inorganic device having improved packing, and a display apparatus comprising the inorganic device are also provided.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
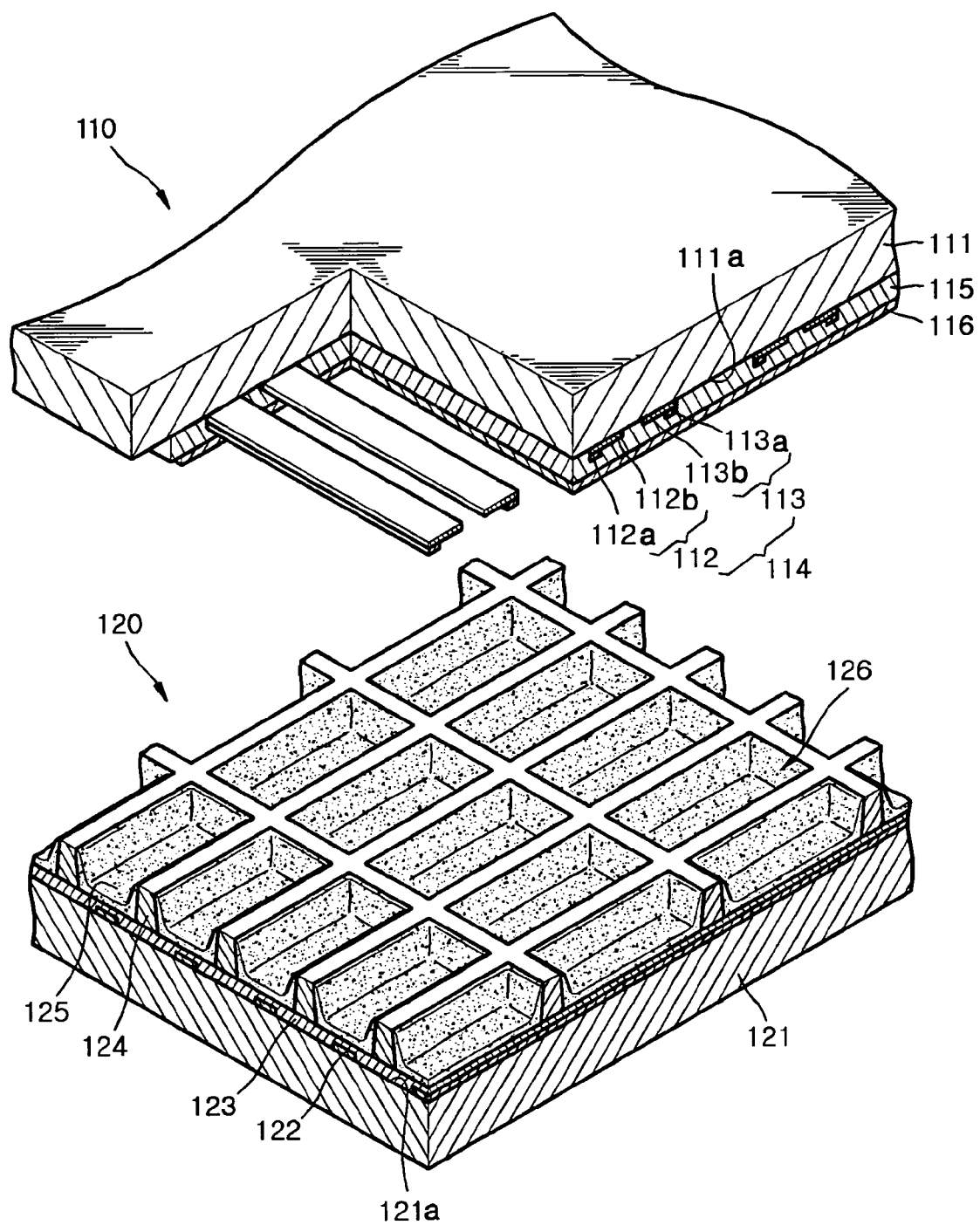
FIG. 1 is a schematic view illustrating a plasma display panel according to the present invention.

The present invention will now be described more fully with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "disposed on" another element, the elements are understood to be in at least partial contact with each other, unless otherwise specified. Spatially relative terms, such as "front", "rear" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees, inverted, or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, real numbers, steps, operations, elements, and/or components, but do not preclude the presence or addition of one or more other features, regions, real numbers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present invention provides a dispersant including a hydrophobic moiety with a branched alkyl group and an arylene group and a hydrophilic moiety with an ethylene oxide group and a carboxylic acid group. The dispersant has both good dispersibility and low residual carbon content after sintering, unlike conventional dispersants with good dispersibility but high residual carbon content or with low residual carbon content but poor dispersibility. Thus, a paste composition including the dispersant has a low viscosity, and an inorganic device made of the paste composition has a low residual carbon content and a better packing density.

As described above, the dispersant includes a hydrophobic moiety with a branched alkyl group and an arylene group and a hydrophilic moiety with an alkylene oxide group and a carboxylic acid group. Here, the alkyl group is a substituted or unsubstituted alkyl group of 5-30 carbon atoms, the arylene group is a substituted or unsubstituted arylene group of 6-30 carbon atoms, and the alkylene oxide group is a substituted or unsubstituted alkylene oxide group of 2-10 carbon atoms.

As used herein, the term "dispersant" refers to, in particular, a surfactant used to promote the distribution and separation of particles. A dispersant is not necessarily a surfactant. However, since discontinuous-phase particles in a continuous phase tend to agglomerate, a surfactant, present at the interface between the continuous phase and the discontinuous-phase particles is used to provide a repulsive force between the discontinuous-phase particles.

The hydrophobic moiety of the dispersant includes a branched alkyl group and an arylene group. A branched alkyl group has a lower aspect ratio than a straight alkyl group, thereby reducing the number of dispersant molecules per unit interface area. Thus, a reduction in surface tension may be relatively small, but the alkyl branches can interact to form an interlinked hydrophobic moiety. Therefore, even when the dispersant molecules collide with other dispersed particles, the hydrophobic moiety can be effectively preserved, thereby enhancing dispersibility. Furthermore, the width of the hydrophobic moiety of the dispersant is larger than the length, thereby increasing the volume of the dispersant. Thus, the dispersant can effectively surround the surfaces of dispersed particles, thereby stabilizing the dispersed particles. A exemplary dispersant, Aerosol® OT, has a branched hydrophobic moiety. That is, the hydrophobic moiety of Aerosol® OT has two hydrophobic chains forming the shape of an isosceles triangle, and thus is very bulky. The arylene group of the hydrophobic moiety of the dispersant can further enhance the adsorption of the dispersant at a particle-liquid interface by association of the aromatic rings to form relatively stable complex.

The hydrophilic moiety of the dispersant includes an alkylene oxide group and a carboxylic acid group. An alkylene oxide group is a representative non-ionic functional group, e.g., an ethylene oxide group. The number of alkylene oxide groups in the dispersant can be easily adjusted according to reaction conditions, which makes it possible to easily control the dispersion characteristics of the dispersant. A carboxylic acid group is a polar functional group, and is generally used in saponified form as a metal salt (e.g., a soap). However, since a metal salt of the carboxylic acid group forms an ionic dispersant, a repulsive force between the dispersant molecules is excessively increased, which limits a potential utility as a dispersant. Thus, in the present invention, the carboxylic acid group is used as the free acid. An exemplary compound with a carboxylic acid group can be a fatty acid with ten or more carbon atoms, which may be used as an auxiliary emulsifier, etc. A carboxylic acid group has two polar groups, i.e., a hydroxy group and a carbonyl group. Thus, the dispersant can be readily attached to the surface of polar particles, and, when treated with heat, can decompose to produce carbon dioxide.

In an embodiment, the alkyl group of the dispersant is a substituted or unsubstituted alkyl group of 5-30 carbon atoms. If the alkyl group has less than 5 carbon atoms, hydrophobicity may be insufficient and the alkyl groups may not sufficiently interact. On the other hand, if the alkyl group has greater than 30 carbon atoms, hydrophobicity may be excessive. The arylene group of the dispersant is a substituted or unsubstituted arylene group of 6-30 carbon atoms. If the arylene group has less than 6 carbon atoms, it may be difficult to obtain a planar arylene group in a neutral state and hence have poor inter-arylene interaction. On the other hand, an arylene group with greater than 30 carbon atoms is very bulky, and thus, dense adsorption of the dispersant at a particle-liquid interface may be difficult due to unfavorable steric interactions. The alkylene oxide group of the dispersant is a substituted or unsubstituted alkylene oxide group of 2-10 carbon atoms. The synthesis of an alkylene oxide group with one carbon atom is difficult, and an alkylene oxide group with more than 10 carbon atoms may render the dispersant insufficiently hydrophilic. The alkyl group, the arylene group, and the alkylene oxide group may be substituted by various non-limiting substituents known in the art, thereby further reducing the surface tension of the dispersant.

In an exemplary embodiment, the arylene group may be phenylene, indenylene, naphthalenylene, phenanthrenylene, anthracenylene, or pyrenylene, but are not limited to these illustrative examples. It is contemplated that, all arylene groups with aromaticity can be used herein, where the use of the arylene groups does not significantly adversely affect the desired properties of the dispersant.

The dispersant may be represented by Formula 1 below:

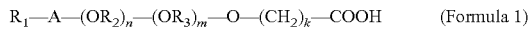

$$R_1-A-(OR_2)_n-(OR_3)_m-O-(CH_2)_k-COOH \quad \text{(Formula 1)}$$

wherein, $R_1$ is a substituted or unsubstituted branched alkyl group of 5-30 carbon atoms;

A is a substituted or unsubstituted arylene group of 6-30 carbon atoms;

$R_2$ and $R_3$ are each independently a straight or branched alkylene group of 2-5 carbon atoms;

k is 0 to 4; and n and m are each independently a real number of 0 to 30 with the proviso that $3 \leq n+m \leq 30$. Where $R^1$ and A are substituted, substituents that may be present include alkyl, aryl, arylalkyl, or alkylaryl groups, each having 1-12 carbon atoms; alkyloxy, aryloxy, arylalkyloxy, or alkylaryloxy groups, each having 1-12 carbon atoms; acyl groups having 1-12 carbon atoms; halogen; carboxylate, nitrile, and the like.

The dispersant may also be represented by Formula 2 below:

(Formula 2)

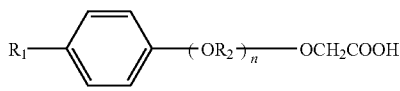

wherein, $R_1$ is a substituted or unsubstituted branched alkyl group of 5-30 carbon atoms;

$R_2$'s are each independently a straight or branched alkylene group of 2-5 carbon atoms; and n is a real number of 0 to 30. Where $R^1$ is substituted, substituents that may be present include alkyl, aryl, arylalkyl, or alkylaryl groups, each having 1-12 carbon atoms; alkyloxy, aryloxy, arylalkyloxy, or alkylaryloxy groups, each having 1-12 carbon atoms; acyl groups having 1-12 carbon atoms; halogen; carboxylate, nitrile, and the like.

The dispersant may also be represented by Formula 3 below:

(Formula 3)

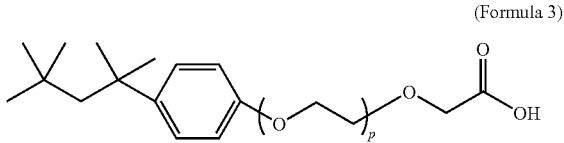

wherein p is 3 to 10.

The dispersant can be synthesized by any one of various non-limiting methods.

The dispersant may leave behind residual carbon in an amount of less than 2 wt % after thermal treatment at a temperature greater than 500° C., specifically greater than or equal to 600° C.

The present invention also provides a paste composition including inorganic particles, an organic solvent, and the above described dispersant. The inorganic particles are not particularly limited, and may be any inorganic particles (e.g., inorganic oxide, metal oxide) known in the art that can be dispersed in an organic solvent, etc., to form a paste. For example, the inorganic particles may be glass particles, phosphor particles, magnetic particles, etc. In a paste formulation made using the inorganic particles, the average particle size of the inorganic particles is more important than the chemical composition of the inorganic particles. The inorganic particles used in the paste composition may have an average particle size ($D_{avg}$) from 0.001 to 1,000 μm, more specifically, from 0.01 to 100 μm, and still more specifically, from 0.1 to 10 μm.

The organic solvent used in the paste composition may be terpineol, butyl carbitol (BC), butyl carbitol acetate (BCA), pentene diol, dipentene, limonene, ethyleneglycol alkylether, diethyleneglycol alkylether, ethyleneglycol alkylether acetate, diethyleneglycol alkylether acetate, diethyleneglycol dialkylether acetate, triethyleneglycol alkylether acetate, triethyleneglycol alkylether, propyleneglycol alkylether, propyleneglycol phenylether, dipropyleneglycol alkylether, tripropyleneglycol alkylether, propyleneglycol alkylether acetate, dipropyleneglycol alkylether acetate, tripropyleneglycol alkylether acetate, dimethyl phthalate, diethyl phthalate, dibutyl phthalate, distilled water, or a mixture thereof, but the present invention is not limited to the illustrated examples. The organic solvent may be any solvent known in the art that can be used in a dispersion with inorganic particles.

The paste composition may be a glass paste composition including a glass powder, an organic binder, an organic solvent, and the above described dispersant.

The glass powder used herein may be a glass frit having a thermal expansion coefficient of $60 \times 10^{-7}$ to $90 \times 10^{-7}/°$ C. (as measured from 30 to 300° C.) and a softening point of 400 to 600° C. The glass powder may have a composition selected from the group consisting of PbO—$SiO_2$, PbO—$SiO_2$—$B_2O_3$, PbO—$SiO_2$—$B_2O_3$—ZnO, PbO—$SiO_2$—$B_2O_3$—BaO, PbO—$SiO_2$—ZnO—BaO, ZnO—$SiO_2$, ZnO—$B_2O_3$—$SiO_2$, ZnO—$K_2O$—$B_2O_3$—$SiO_2$—BaO, $Bi_2O_3$—$SiO_2$, $Bi_2O_3$—$B_2O_3$—$SiO_2$, $Bi_2O_3$—$B_2O_3$—$SiO_2$—BaO, ZnO—BaO—$B_2O_3$—$P_2O_5$—$Na_2O$, and $Bi_2O_3$—$B_2O_3$—$SiO_2$—BaO—ZnO.

For example, a PbO—$B_2O_3$—$SiO_2$-based glass frit may have a composition of 35-75% PbO, 0-50% $B_2O_3$, 8-30% $SiO_2$, 0-10% $Al_2O_3$, 0-10% ZnO, 0-10% CaO+MgO+SrO+BaO, and 0-6% $SnO_2$+$TiO_2$+$ZrO_2$ by weight, based on 100% by weight of the combined components of the glass.

A BaO—ZnO—B$_2$O$_3$—SiO$_2$-based glass frit may have a composition of 20-50% BaO, 25-50% ZnO, 10-35% B$_2$O$_3$, and 0-10% SiO$_2$ by weight, or a composition of 3-25% BaO, 30-60% ZnO, 15-35% B$_2$O$_3$, 3-20% SiO$_2$, and 1-12% Li$_2$O+Na$_2$O+K$_2$O by weight, based on 100% by weight of the combined components of the glass.

A ZnO—BiO—B$_2$O$_3$—B$_2$O$_3$—SiO$_2$-based glass frit may have a composition of 25-45% ZnO, 15-40% Bi$_2$O$_3$, 10-30% B$_2$O$_3$, 0.5-10% SiO$_2$, and 0-24% CaO+MgO+SrO+BaO by weight, based on 100% by weight of the combined components of the glass.

A ZnO—BaO—B$_2$O$_3$—P$_2$O$_5$—Na$_2$O-based glass frit may have a composition of 30-35% ZnO, 20-25% BaO, 30-35% B$_2$O$_3$, 8-12% P$_2$O$_5$, and 3-5% Na$_2$O by weight, based on 100% by weight of the combined components of the glass.

The particle shape of the glass frit is not particularly limited, but may desirably be spherical since spherical particles have a better packing factor and UV transmissivity than plate-like or amorphous particles. The glass frit may have an average particle size ($D_{avg}$) of 2 to 5 μm, a minimal particle size ($D_{min}$) of 0.5 μm, and a maximum particle size ($D_{max}$) of 10 μm. If the average particle size of the glass frit is less than 2 μm or the minimal particle size of the glass frit is less than 0.5 μm, exposure sensitivity may be lowered or a sintering shrinkage may be increased, which makes it difficult to form the desired barrier ribs of a plasma display panel. On the other hand, if the average particle size of the glass frit exceeds 5 μm or the maximum particle size of the glass frit exceeds 10 μm, the compactness and directionality of barrier ribs may be significantly adversely affected.

As described above, the glass frit may have a softening point of 400 to 600° C. If the softening point of the glass frit is less than 400° C., barrier ribs having the desired shape after sintering may not be obtained. On the other hand, if the softening point of the glass frit exceeds 600° C., softening may not occur properly. The thermal expansion coefficient of the glass frit may be similar to the thermal expansion coefficient of a substrate intended for forming barrier ribs. This is because a large difference in thermal expansion coefficient between the glass frit and the substrate can cause the distortion of the substrate, and potentially substrate breakage.

The glass powder may further include other components, in addition to a pure glass component. Thus, the glass powder may include rare earth oxide (e.g., La$_2$O$_3$), P$_2$O$_5$, MnO, Fe$_2$O$_3$, CoO, NiO, GeO$_2$, Y$_2$O$_3$, MoO$_3$, Rh$_2$O$_3$, Ag$_2$O, In$_2$O$_3$, TeO$_2$, WO$_3$, ReO$_2$, VO$_5$, PdO, etc. The glass powder may also include a ceramic filler. The ceramic filler may be alumina, titania (rutile/anatase), zirconia, zircon, α-quartz, quartz glass, β-quartz solid solution, etc. In particular, when a silica-based material, such as α-quartz, is used as the ceramic filler, low-dielectric barrier ribs can be obtained, thereby reducing power consumption. Furthermore, in order to enhance the mechanical strength of barrier ribs, the ceramic filler may be partially or wholly spherical.

Thus, the glass powder may include a glass frit comprising at least one selected from the group consisting of PbO, BaO, SiO$_2$, B$_2$O$_3$, Al$_2$O$_3$, ZnO, Bi$_2$O$_3$, MgO, Na$_2$O, K$_2$O, TiO$_2$, ZrO$_2$, CuO, and SnO$_2$, and other components.

The organic binder may be a cellulose resin, a butyral resin, polyethylene oxide, polymethylmethacrylate, polyacrylester, polypropylene carbonate, etc., but the present invention is not limited to the illustrated examples. Of course, one or more organic binders can also be used.

More specifically, the cellulose resin serves to enhance the strength of a dry film resist, and the adhesion between a substrate and the dry film resist. Thus, the cellulose resin may be ethylcellulose, hydroxyethylcellulose, methylcellulose, carboxymethylcellulose, etc. Ethylcellulose is specifically useful and confers characteristics to the paste composition that render it suitable for the printing or coating of a barrier rib material.

The butyral resin provides adhesion between the substrate and the dry film resist. In an embodiment, adhesion between a substrate and a dry film resist is provided using a combination of the butyral resin with the cellulose resin. In order to achieve desired strength and flexibility in a dry film, it is desirable to use a butyral resin with a polymerization degree of 200 to 1,000 and a weight average molecular weight ($M_w$) of 30,000 to 200,000. In order to enhance an adhesion between a substrate and a dry film, it is preferable to use a butyral resin having a butyral content of 70 to 80 mol % based on the total monomeric content of the butyral resin.

A cellulose resin can be used alone as the organic binder of the glass paste composition. However, a mixture of a cellulose resin and a butyral resin with a weight ratio of 90:10 to 50:50 may also be used.

The glass paste composition may further include a dispersant such as menhaden fish oil, polyethyleneimine, glyceryl trioleate, polyacrylic acid, corn oil, glycerin, or phosphate ester, in addition to the above described dispersant.

The glass paste composition may further include another additive, without limitation. The additive may be a plasticizer such as diethyl oxalate, polyethylene, polyethylene glycol, dimethyl phthalate, dibutyl phthalate, or dioctyl phthalate; an antioxidant; a leveling agent; an antifoaming agent; an anti-agglomerating agent; etc.

The glass paste composition may include 3-6 parts by weight of the organic binder, 21-74 parts by weight of the organic solvent, and 0.5-3 parts by weight of the dispersant, based on 100 parts by weight of the glass powder.

If the content of the organic binder is less than 3 parts by weight, a dry film break or otherwise become defective during use. On the other hand, if the organic binder content exceeds 6 parts by weight, the viscosity of the paste can increase excessively due to the high initial viscosity of the organic binder solution.

If the content of the organic solvent is less than 21 parts by weight, the viscosity of a paste can increase due to a high initial viscosity of an organic binder solution. On the other hand, if the organic solvent exceeds 74 parts by weight, a dry film may break or otherwise be defective due to a relatively low content of the organic binder.

If the content of the dispersant is less than 0.5 parts by weight, inorganic particles may be insufficiently dispersed, thereby increasing the viscosity of a paste. On the other hand, if the content of dispersant exceeds 3 parts by weight, surplus dispersant molecules that are not attached to the surfaces of inorganic particles may be mixed with a polymer solution, thereby increasing the viscosity of a paste.

The glass paste composition may further include 0.1-3 parts by weight of the additive based on 100 parts by weight of the glass powder.

If the content of the additive(s) is less than 0.1 parts by weight, desirable properties of the film may be compromised. For example, where a low level of a plasticizer is used, film breakage may occur during drying. On the other hand, if the content of additive exceeds 3 parts by weight, other undesired effects can occur. For example, where surplus plasticizer is used, the function of the dispersant may be hindered.

The glass paste composition may have a viscosity of 10,000 to 60,000 centipoise (cps) measured at a temperature of 25° C. and at a shear rate of 1 sec$^{-1}$. If the viscosity of the glass paste composition exceeds 60,000 cps, printing of a pattern using the glass paste composition may not be effectively performed. On the other hand, if it is less than 10,000 cps, film formation after printing may occur poorly.

The paste composition may also be a phosphor paste composition including a phosphor, an organic binder, an organic solvent, and a dispersant.

In the phosphor paste composition, the phosphor may be $YBO_3:Tb^{3+}$, $BaMg_{10}Al_{17}:Eu$, $YGdBO_3:Eu$, $Zn_2SiO_4:Mn$, etc. The phosphor may have an average particle size of 0.5 to 5.0 μm. If the average particle size of the phosphor is less than 0.5 μm, optical characteristics of a film formed from the phosphor paste composition may be adversely affected. On the other hand, if the phosphor particle size exceeds 5.0 μm, poor film quality may result due to nozzle clogging during film formation.

The organic binder and the organic solvent of the phosphor paste composition are as described above with respect to the glass paste composition.

The phosphor paste composition may further include an additive such as a plasticizer, an antioxidant, and a leveling agent.

The phosphor paste composition may include 3-6 parts by weight of the organic binder, 21-74 parts by weight of the organic solvent, and 0.5-3 parts by weight of the dispersant, based on 100 parts by weight of the phosphor.

If the content of the organic binder is less than 3 parts by weight, the viscosity of the phosphor paste composition may be difficult to adjust. On the other hand, if the content of the organic binder exceeds 6 parts by weight, photoluminescence efficiency may be reduced due to the presence of residual carbon after sintering of the phosphor paste composition.

If the content of the organic solvent is less than 21 parts by weight, printability may be poor due to the high viscosity of the resulting phosphor paste composition. On the other hand, if the content of organic solvent exceeds 74 parts by weight, the viscosity of a paste may be lowered, and coating quality may be poor.

If the content of the dispersant is less than 0.5 parts by weight, the phosphor particles may be insufficiently dispersed, thereby increasing the viscosity of the phosphor paste composition. On the other hand, if the content of the dispersant exceeds 3 parts by weight, surplus dispersant molecules that are not attached to the surfaces of the phosphor particles may mix with the polymer solution, and thereby affect the viscosity of the phosphor paste composition.

The phosphor paste composition may further include 0.1-3 parts by weight of an additive based on 100 parts by weight of the phosphor.

If the content of the additive is less than 0.1 parts by weight, undesirable film properties may result. For example, where a low amount of a plasticizer is used, film breakage or depression may be caused while the film is under a thermal stress, due to a reduction in film strength. On the other hand, if the content of additive exceeds 3 parts by weight, other properties of the phosphor paste composition may be affected. For example, where a surplus of plasticizer is used, particle dispersion may be insufficient due to high initial viscosity of an organic solution.

The present invention also provides a display apparatus formed using the paste composition, e.g., a plasma display panel (PDP), a liquid crystal display (LCD), or a field emission display (FED). More specifically, the present invention provides a display apparatus including a sintered product formed by sintering, processing, etc. of the paste composition. The sintered product formed from the paste composition is an inorganic device having improved packing density. That is, the paste composition can provide slurry containing more inorganic particles than a conventional paste composition at the same viscosity, and the sintering of a slurry made of the paste composition can therefore produce a sintered product (i.e., an inorganic device) with improved packing density. In the present invention, the sintered product may be a barrier rib or a phosphor layer of a PDP. The barrier rib or phosphor layer can be formed by drying, sintering, etc. of the paste composition according to any suitable processing method. For example, a barrier rib of a PDP can be formed using a screen printing process, a sand blasting process, an additive process, a photosensitive paste process, a LTCCM (Low Temperature Co-fired Ceramic on Metal) process, etc. A method of forming the sintered product thus includes thermally treating the paste composition at a temperature greater than 500° C. The sintered product (i.e., inorganic device) prepared using this method has a low residual carbon content of less than 2 wt %.

The present invention also provides a display apparatus including a sintered product obtained by sintering the paste composition of the present invention. The display apparatus may be a PDP. An exemplary PDP is illustrated in FIG. 1. With respect to the manufacturing of a PDP, referring to FIG. 1, a front panel 110 comprises electrode pairs 114, each of which includes an X electrode 113 and a Y electrode 112, disposed on a surface of a front glass substrate 111 by patterning a layer of the electrode material. A transparent dielectric layer 115 is disposed on the electrode pairs 114 to encase and protect the electrode pairs 114, and a protective layer 116 comprising MgO is then disposed on the exposed surface of the transparent dielectric layer 115 to complete front panel 110.

With respect to the manufacturing of a rear panel 120, an address electrode 122 is disposed on a surface of a rear glass substrate 121 by patterning a layer of the electrode material, and a dielectric layer 123 is disposed on the address electrode 121. Then, a glass paste composition is disposed on the entire surface of dielectric layer 123, dried, processed into desired partition patterns using a photomask-sand blasting process, and sintered to thereby form barrier ribs 124 disposed on the surface of the dielectric layer 123. Then, a phosphor layer 125 disposed on the surface of the dielectric layer 123 located between barrier ribs 124, is formed by printing and sintering a phosphor paste composition as disclosed herein.

A sealing material 111a is disposed on the peripheries (i.e., the edges) of the front glass substrate 111 and a sealing material 121a is disposed on the peripheries of the rear glass substrate 121, using a dispenser. The front panel 110 and the rear panel 120 are assembled so that the electrodes of the two panels 110 and 120 face each other, and are panelized, sintered, and degassed to inject a discharge gas, such as Ne or He—Xe, into a discharge space disposed between the panels 110 and 120. Other constituent elements of a PDP may also be made using the glass paste composition disclosed herein.

Figure 2:
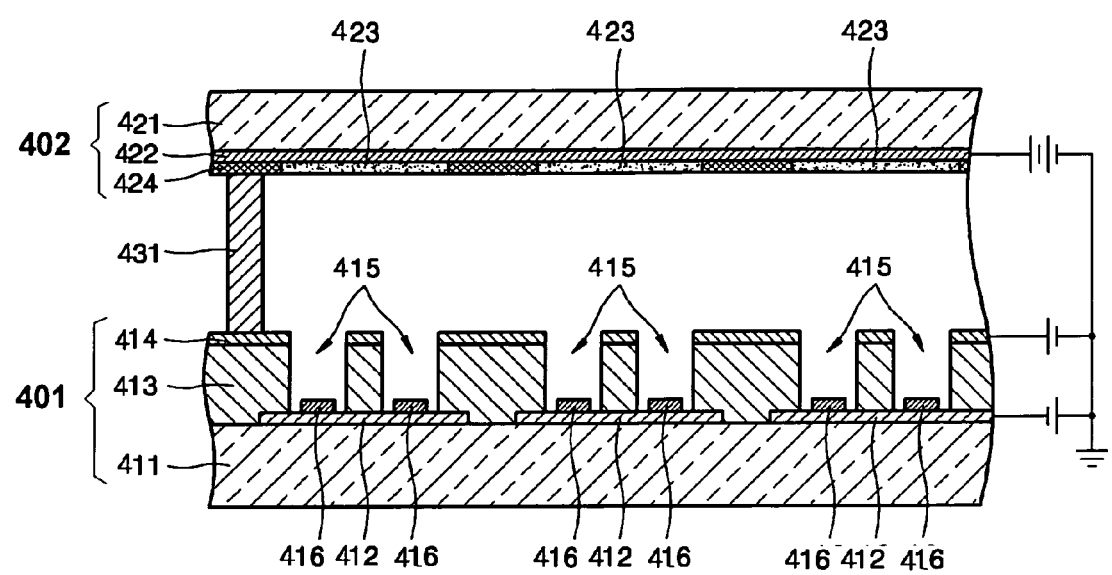
FIG. 2 is a schematic view illustrating a field emission display according to the present invention.

The display apparatus may also be a FED. A FED is illustrated in FIG. 2. Referring to FIG. 2, a FED has a triode structure comprising a cathode 412 disposed on a surface of a rear substrate 411, an anode 422 disposed on a surface of a front substrate 421, the cathode 412 and anode 422 each held proximate to and facing the other, and a gate electrode 414 disposed between cathode 412 and anode 422. With respect to the manufacturing of the FED, the cathode 412 is disposed on a face of the rear substrate 411, and emitters 416 are disposed on a surface of the cathode opposite the rear substrate. The anode 422 is disposed on a surface of front substrate 421, and a phosphor layer 423 formed from a phosphor paste composition is disposed on a surface of anode 422 opposite front substrate 421. A black matrix 424 is also disposed on the same surface of anode 422 as phosphor layer 423, and the edges of phosphor layer 423 are bounded by black matrix 424 such that areas of phosphor layer 423 are surrounded by the black matrix 424, thereby providing contrast enhancement for the phosphor. An insulating layer 413 is disposed on and in partial contact with each of cathode 412 and rear substrate 411, such that rear substrate 411 and cathode 412 are completely covered by insulating layer 411. Gate electrode 414 is disposed on the surface of insulating layer 413 opposite rear substrate 411, and the gate electrode and insulating layer 411 over the cathode 412 is patterned to define microholes 415 exposing cathode 412. A spacer 431 is disposed between and in partial contact with each of the surfaces of the rear substrate assembly 401 having the gate electrode 414 and the front substrate assembly 402 having anode 422, to hold proximate and maintain a distance between the two substrate assemblies 401 and 402.

A display apparatus including a sintered product obtained by sintering a paste composition is not limited to the above-illustrated display apparatuses. That is, a sintered product obtained by sintering a paste composition can also be applied to the manufacture of other types of display apparatuses. In a specific embodiment, a PDP includes barrier ribs obtained by sintering the paste composition disclosed herein.

Hereinafter, the present invention will be described more specifically with reference to the following examples and comparative examples. The following working examples are for illustrative purposes and are not intended to limit the scope of the present invention.

Preparation of Dispersants

EXAMPLE 1

7.32 g (305 mmol) of NaH was placed in a flask and mixed with 500 ml of THF. 13 g (30.5 mmol) of compound 1 were added dropwise to the reaction mixture at room temperature under an argon atmosphere. The resultant solution was stirred for about 4 hours, and 76.4 g (457.7 mmol) of compound 2 were added dropwise thereto. The resultant solution was incubated at room temperature for 48 hours. Solvent was removed from the resultant solution, and the residue was precipitated with n-hexane. The precipitate was removed by filtration with celite, and the filtrate was distilled under reduced pressure. The resulting residue was purified on a silica column and eluted with a mixture of methanol and methylene chloride ("MC") (MC:MeOH=20:1 (v/v)) to give a red oily product (compound 3) (yield: 78%).

Figure 10:
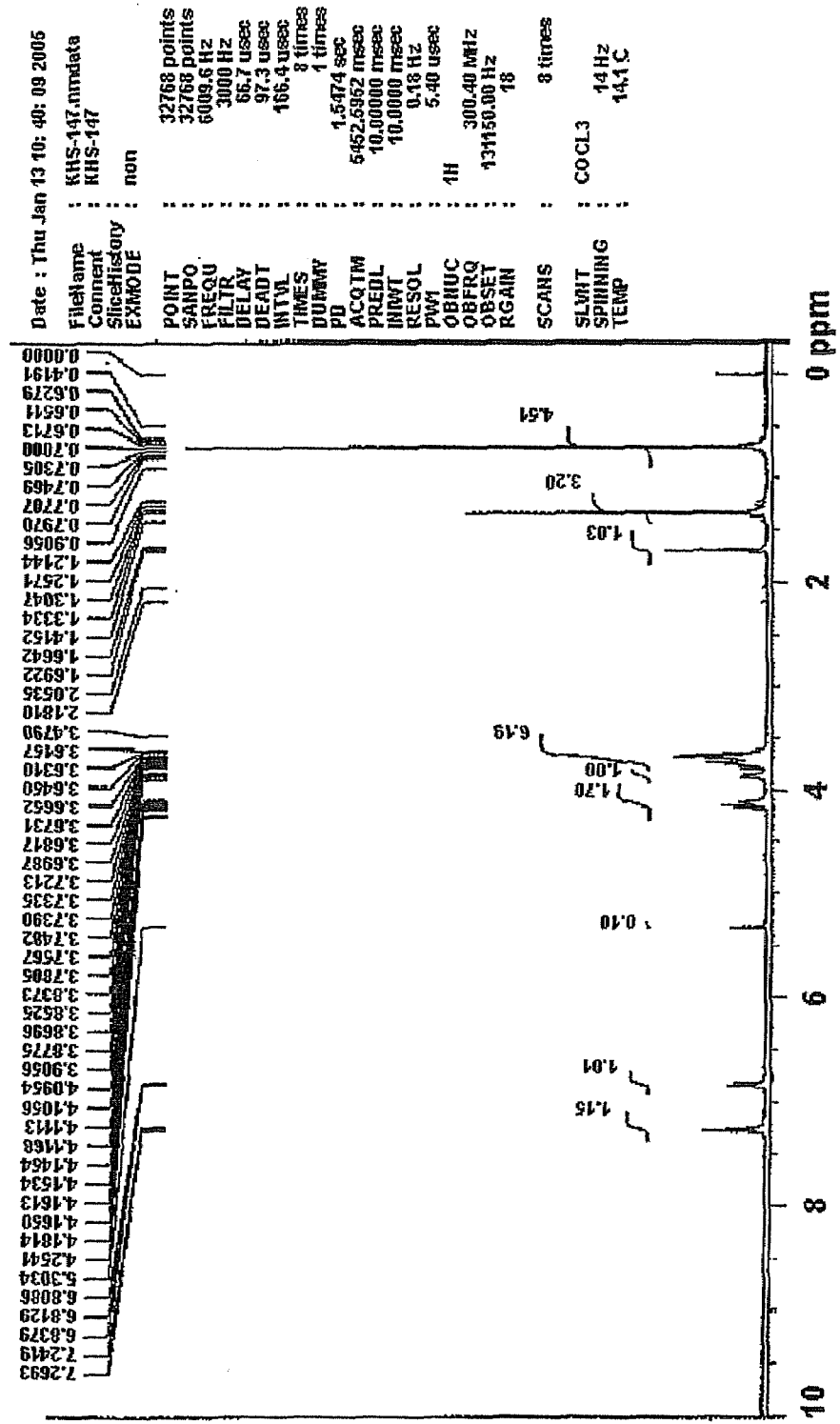
FIG. 10 is a $^1H$ NMR spectrum of a compound of Formula 3 (p=5)

12.7 g (23.9 mmol) of compound 3 were refluxed in 200 ml of a 1N NaOH aqueous solution for 12 hours or more. The resultant aqueous solution was then adjusted to pH of 2 by addition of 1N HCl, and extracted twice with 200 ml of $CHCl_3$. The combined $CHCl_3$ layers were dried over $MgSO_4$, and the solvent was distilled off under a reduced pressure. The residue was purified on a silica column (MC:MeOH=20:1 (v/v) as eluant) to give 10.28 g (yield: 88.6%) of a yellow oily product (compound 4: polyoxyethylene-1,1,3,3-tetramethyl-butylphenylether carboxylic acid). A $^1H$ NMR spectrum of the purified product, compound 4, is shown in FIG. 10.

The above-described dispersant preparation method is schematically illustrated in Reaction Scheme 1, below:

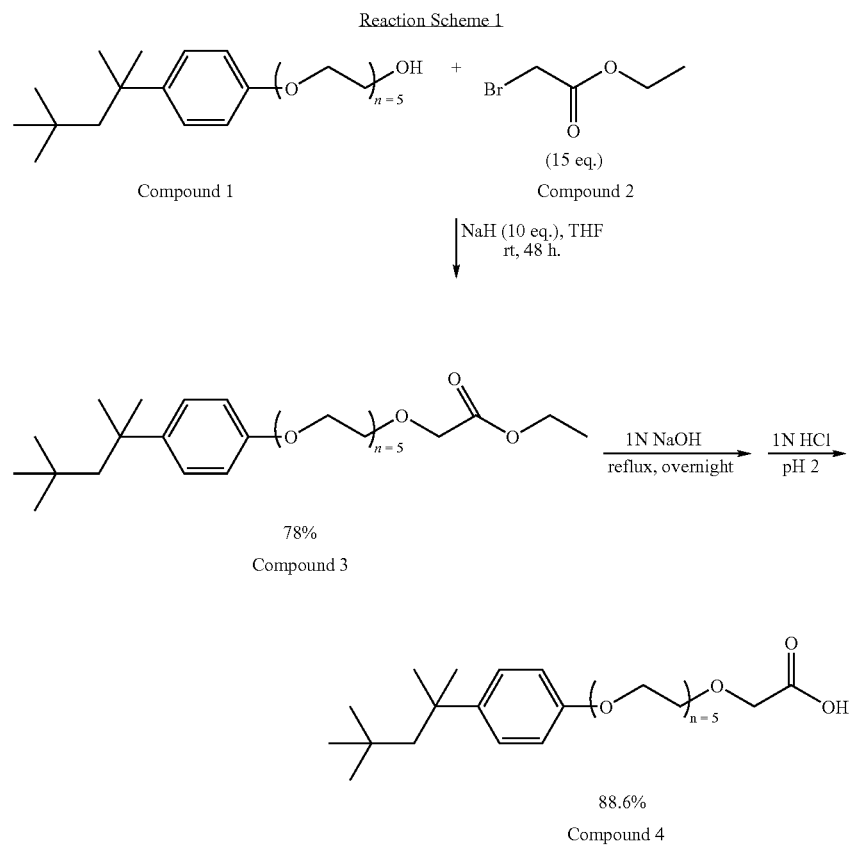

EXAMPLE 2

50 mmol of NaH was placed in a flask and mixed with 50 ml of THF. Then, 20 mmol of Triton®-X 100 (polyoxyethylene-1,1,3,3-tetramethylbutylphenyl ethoxylates, with an average molar number of ethylene oxide unit of 10) was dropwise added to the reaction mixture at 25° C. under an argon atmosphere, and the resultant solution was stirred for about 2 hours. Then, 50 mmol of ethylbromoacetate was dropwise added to the resultant solution at 0° C. for 2 hours, and the resultant solution was then incubated at 25° C. for 12 hours. Then, the resultant solution was added to ice water. The organic layer was separated, sequentially washed with an HCl solution and water, and distilled under a reduced pressure. A solvent was distilled to give a yellow viscous oil (polyoxyethylene-1,1,3,3-tetramethylbutylphenylether ethyl carboxylate) (yield: 78%).

18 mmol of the yellow viscous oil was added to a mixed solution of 200 ml of a 1M NaOH aqueous solution and 10 ml of methanol, and the resultant mixture was refluxed for 12 hours. Then, the resultant solution was adjusted to pH of 2 by addition of 1N HCl, and extracted twice with 200 ml of the $CHCl_3$. The combined $CHCl_3$ layers were dried over $MgSO_4$, and the solvent was distilled off under a reduced pressure. The residue was purified on a silica column (MC:MeOH=20:1 (v/v) as eluant) to give a yellow oily product (polyoxyethylene-1,1,3,3-tetramethylbutylphenylether carboxylic acid) (yield: 84%).

EXAMPLE 3

A dispersant was prepared in the same manner as in Example 2 except that Triton® X-45 (polyoxyethylene-1,1,3,3-tetramethylbutylphenyl ethoxylates, with an average molar number of ethylene oxide units of 5) was used instead of Triton® X-100.

EXAMPLE 4

A dispersant was prepared in the same manner as in Example 2 except that Igepal® CA-210 (polyoxyethylene-1,1,3,3-tetramethylbutylphenyl ethoxylates, having an average molar number of ethylene oxide units of 2) was used instead of Triton® X-100.

Comparative Example 1

A phosphate-based dispersant, BYK111 (Disperbyk 111, BYK-Chemie GmbH), was used.

Comparative Example 2

A reagent-grade oleic acid (available from Aldrich), which was a fatty acid, was used as the dispersant.

Comparative Example 3

Sarcosine (oleoyl sarcosine, Nippon Oil & Fat Co., Ltd.) was used as the dispersant.

Comparative Example 4

A carboxylic acid-based dispersant, KD9 (Uniqema), was used.

Comparative Example 5

An acid-based dispersant, KD15 (Uniqema), was used.
Preparation of Glass Paste Compositions

EXAMPLE 5

37.69 g of a glass powder (85 wt % of glass frit (35 wt % ZnO, 20 wt % BaO, 30 wt % $B_2O_3$, and 12 wt % $P_2O_5$), 5 wt % of ZnO, and 10 wt % of $Al_2O_3$), 1.93 g of ethyl cellulose, 8.68 g of terpineol, 8.68 g of butylcarbitol acetate, 0.4 g of dibutyl phthalate, and 0.38 g of the dispersant prepared in Example 1 were mixed, stirred with a stirrer, and kneaded with a 3-roll mill to prepare a glass paste composition according to the present invention. Here, the glass powder was used conjointly with a matrix composition. For this, prior to the addition of the glass powder, matrix components were mixed to obtain the vehicle.

Comparative Example 6

A glass paste composition was prepared in the same manner as in Example 2 except that the phosphate-based dispersant, BYK111, of Comparative Example 5 was used instead of the dispersant prepared in Example 1.

Comparative Example 7

A glass paste composition was prepared in the same manner as in Example 5 except that the oleic acid of Comparative Example 2 was used instead of the dispersant prepared in Example 1.

Comparative Example 8

A glass paste composition was prepared in the same manner as in Example 5 except that the sarcosine of Comparative Example 3 was used instead of the dispersant prepared in Example 1.
Preparation of Phosphor Paste Compositions

EXAMPLE 6

40 g of a $BaMg_{10}Al_{17}$:Eu phosphor with an average particle size of about 2.5 μm, 6 g of ethylcellulose (EC) as a binder, 54 g of a mixed solvent of terpineol and butylcarbitol acetate (BCA) with a weight ratio of 7:3 as an organic solvent, and 0.4 g of the dispersant prepared in Example 1 were mixed with a paste stirrer to prepare a phosphor paste composition according to the present invention.

EXAMPLE 7

40 g of a $BaMgAl_{10}O_{17}$:$Eu^{2+}$,$Mn^{2+}$ phosphor (Kasei Optonix, Japan) with an average particle size of about 3.81 μm, which had been dried under vacuum at 130° C. for 24 hours, 6 g of ethylcellulose (EC) (Ethocel®, standard 45, Dow Chemical Corp., U.S.A.) as a binder, 54 g of a mixed solvent of α-terpineol (Kanto Chemical Co., Japan) and butylcarbitol acetate (BCA) (Kanto Chemical Co., Japan) with a weight ratio of 7:3 as a dispersion medium, and 0.4 g of the dispersant prepared in Example 2 were mixed with a paste stirrer to prepare a phosphor paste composition according to the present invention.

EXAMPLE 8

A phosphor paste composition was prepared in the same manner as in Example 13 except that the dispersant prepared in Example 3 was used instead of the dispersant prepared in Example 2.

EXAMPLE 9

A phosphor paste composition was prepared in the same manner as in Example 7 except that the dispersant prepared in Example 4 was used instead of the dispersant prepared in Example 2.

EXAMPLE 10

A phosphor paste composition was prepared in the same manner as in Example 7 except that the content of the dispersant was 1 wt %, and a solid content was changed in a range from 10 to 40 vol % by 5 vol % increments. At this time, the content of the dispersion medium was reduced with an increase in the solid content.

EXAMPLE 11

A phosphor paste composition was prepared in the same manner as in Example 7 except that the content of the dispersant was 1 wt %, and a solid content was 32 vol %. At this time, the content of the dispersion medium was reduced with an increase in the solid content.

Comparative Example 9

A phosphor paste composition was prepared in the same manner as in Example 6 except that no dispersant was used.

Comparative Example 10

A phosphor paste composition was prepared in the same manner as in Example 7 except that the dispersant of Comparative Example 2 was used instead of the dispersant prepared in Example 2.

Comparative Example 11

A phosphor paste composition was prepared in the same manner as in Example 7 except that the dispersant of Comparative Example 3 was used instead of the dispersant prepared in Example 2.

Comparative Example 12

A phosphor paste composition was prepared in the same manner as in Example 7 except that the dispersant of Comparative Example 4 was used instead of the dispersant prepared in Example 2.

Comparative Example 13

A phosphor paste composition was prepared in the same manner as in Example 7 except that the dispersant of Comparative Example 5 was used instead of the dispersant prepared in Example 2.

Comparative Example 14

A phosphor paste composition was prepared in the same manner as in Example 7 except that no dispersant was used.

Comparative Example 15

A phosphor paste composition was prepared in the same manner as in Comparative Example 9 except that the solid content was adjusted from 10 to 30 vol % in 5 vol % increments. The total amount of the dispersion medium was thereby reduced by increasing the solids content.

Comparative Example 16

A phosphor paste composition was prepared in the same manner as in Comparative Example 9 except that the final solids content was 24 vol %. the total amount of the dispersion medium was thereby reduced by increasing the solids content.

Formation of Barrier Ribs of PDPs

EXAMPLE 12

The glass paste composition prepared in Example 5 was coated to a thickness of about 150 μm on a substrate and dried to form a paste coating layer. Then, a dry film resist (DFR) film, which is an anti-abrasive photosensitive film used to selectively protect portions of paste coating layer during subsequent sand blasting, was laminated onto a surface of the paste coating layer by pressing DFR film onto the paste coating layer using a roll. The DFR film was then subjected to exposure to light, followed by development to form a mask pattern for the sand blasting. High-speed sand blasting was then performed on the exposed portions of the paste coating layer through the mask pattern to form barrier ribs by abrasion. The mask pattern was then removed, and the barrier ribs were sintered at a temperature of 480 to 500° C. for 30 minutes (total sintering time: 2 hours) to provide the desired barrier ribs.

Comparative Example 17

Barrier ribs were formed in the same manner as in Example 12 except that the glass paste composition prepared in Comparative Example 7 was used instead of the glass paste composition prepared in Example 5.

Formation of Phosphor Layers

EXAMPLE 13

The phosphor paste composition prepared in Example 6 was coated on the barrier ribs formed in Example 12, dried, and sintered at a temperature of 480 to 500° C. for 30 minutes (total sintering time: 2 hours) to form a phosphor layer having a thickness of 79.34 μm.

Comparative Example 18

A phosphor layer having a thickness of 79.34 μm was formed in the same manner as in Example 13 except that the phosphor paste composition prepared in Comparative Example 15 was used instead of the phosphor paste composition prepared in Example 3.

Experimental Example 1

Measurement of Viscosities of Glass Paste Compositions (Dispersibility Evaluation)

The viscosities of the glass paste compositions prepared in Example 5 and Comparative Examples 6-8 were measured using a brookfield viscometer (model RVII) and a cylinder-type spindle #14 at 25° C. to evaluate the dispersibility of the glass paste compositions, and the experimental results are presented in Table 1 below.

TABLE 1

| Sample | Viscosity at shear rate of 0.2/sec | Viscosity at shear rate of 1/sec | Viscosity at shear rate of 10/sec |
| --- | --- | --- | --- |
| Example 5 | 10,000 | 10,000 | 10,500 |
| Comparative Example 6 | 10,000 | 9,000 | 8,750 |
| Comparative Example 7 | 30,000 | 21,000 | 19,500 |
| Comparative Example 8 | 10,000 | 11,500 | 11,688 |

Figure 3:
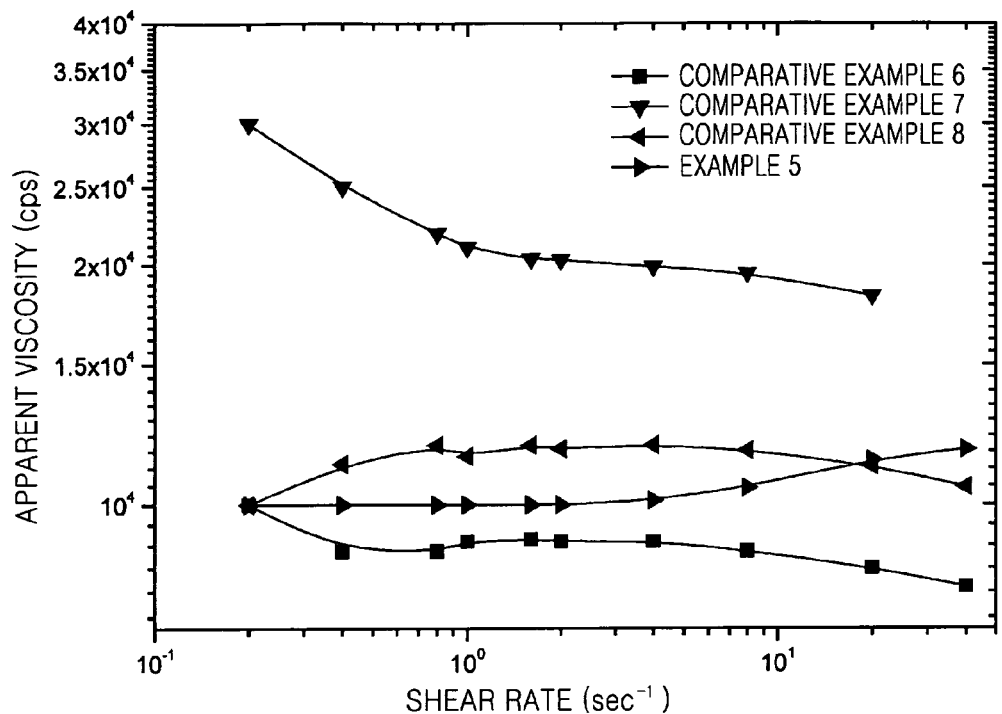
FIG. 3 is a graph illustrating the apparent viscosities of paste compositions prepared in Example 5 and Comparative Examples 6-8.

As presented in Table 1, the glass paste composition of Comparative Example 6 (using a phosphate-based dispersant, BYK111) exhibited the lowest viscosity value. This result shows that the glass paste composition of Comparative Example 6 has the highest dispersibility. The viscosity of the glass paste composition of Example 5 was similar to that of the glass paste composition of Comparative Example 6. The glass paste compositions of Comparative Examples 7-8 exhibited higher viscosity than the glass paste composition of Example 5. A plot of the results of Table 1 is shown in FIG. 3. The low viscosity of the glass paste composition of Example 5 can be explained by the dispersant used in Example 5. That is, the dispersant used in Example 5 has a hydrophobic moiety with a branched alkyl group and an arylene group that enables it to form, on the surfaces of the glass particles, a stable hydrophobic layer that is not easily destroyed upon collision of the glass particles during preparation and coating of the glass paste composition, and a hydrophilic moiety that has a relatively large contact area with glass particles at the interface between the organic solvent and the glass particles sufficient to reduce the surface tension, thereby stabilizing the glass particles.

Experimental Example 2

Measurement of Dynamic Viscosities of Phosphor Paste Compositions (Dispersibility Evaluation)

The dynamic viscosities of the phosphor paste compositions prepared in Example 6 and Comparative Example 9 were measured using an AR 200 viscometer (Thermal Analysis (TA) Instruments, Inc.) and a 60 mm cone-type spindle at 25° C. to evaluate the dispersibility of the phosphor paste compositions, and the experimental results are presented in Table 2 below.

TABLE 2

| Sample | Viscometer at shear rate of 0.2/sec | Viscosity at shear rate of 1/sec | Viscosity at shear rate of 10/sec |
| --- | --- | --- | --- |
| Example 6 | 7,044 | 3,852 | 2,881 |
| Comparative Example 9 | 59,270 | 15,280 | 7,068 |

Figure 4:
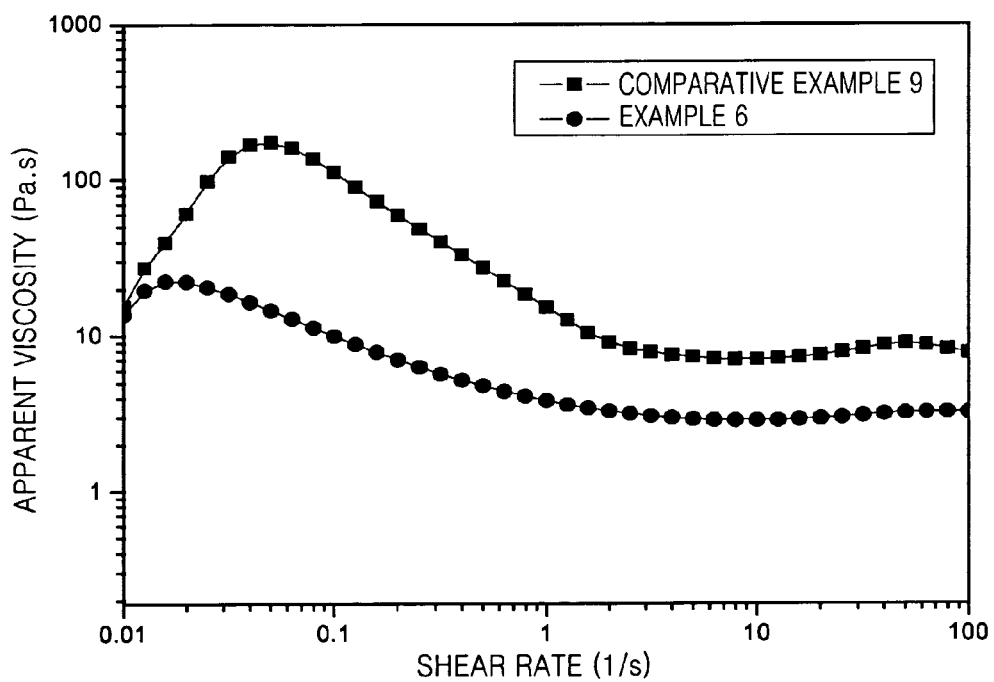
FIG. 4 is a graph illustrating the dynamic viscosities of paste compositions prepared in Example 6 and Comparative Example 9 with respect to frequency (shear rate)
Figure 5:
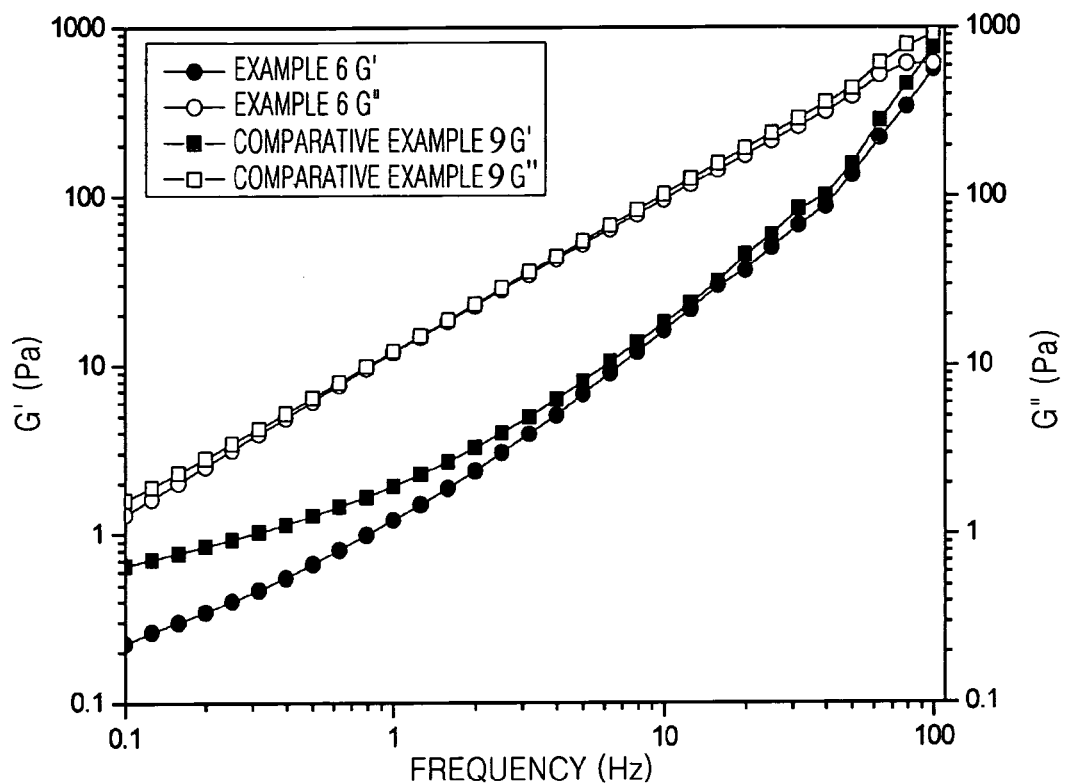
FIG. 5 is a graph illustrating the storage modulus (G') and loss modulus (G") of the paste compositions prepared in Example 6 and Comparative Example 9.
Figure 6:
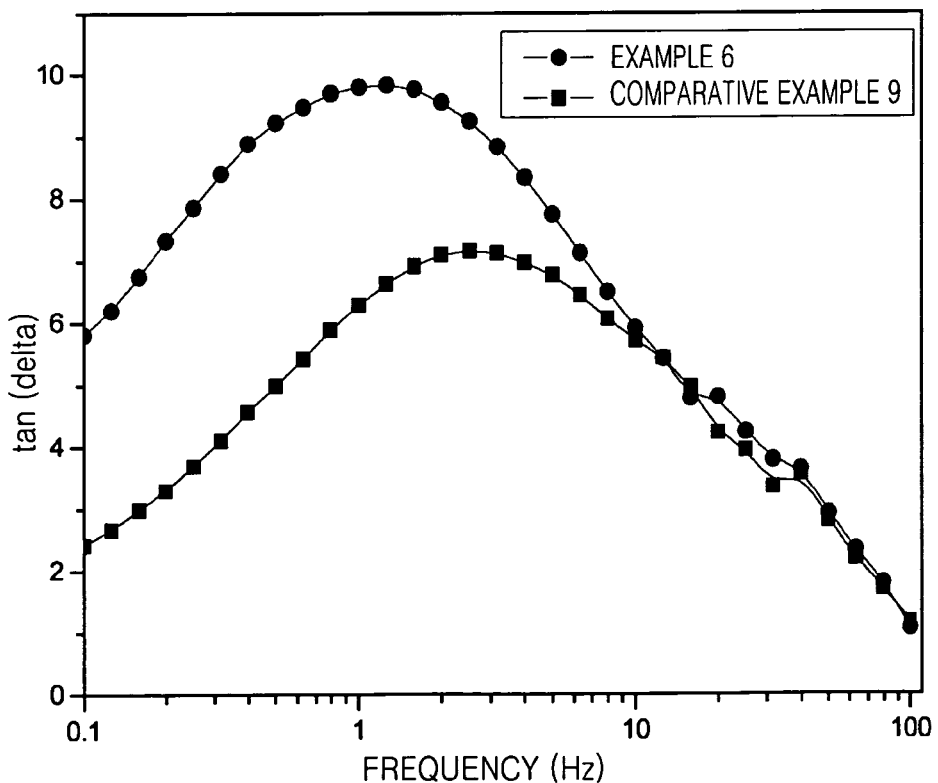
FIG. 6 is a graph illustrating the tangent(delta) of the paste compositions prepared in Example 6 and Comparative Example 9.

The experimental results for Example 6 and Comparative Example 9 are shown in FIGS. 4-6. Referring to FIG. 4, the dispersant-containing phosphor paste composition of Example 6 exhibited a lower dynamic viscosity than the dispersant-free phosphor paste composition of Comparative Example 9. These experimental results can be represented by a storage modulus (G') and a loss modulus (G"), as shown in FIG. 5, for the purpose of interpretation. Here, the storage modulus (G') is the energy stored in a fluid under strain, and the loss modulus (G") is the energy lost from a fluid under strain. The ratio of the loss modulus to the storage modulus (G"/G') is represented by tangent (tan δ), as shown in FIG. 6. A less elastic fluid, i.e., a fluid with good dispersibility or a dilute solution, has a higher tan δ value, whereas a highly elastic fluid, i.e., a fluid with poor dispersibility or a concentrated solution has a lower tan δ value. Referring to FIG. 6, the dispersant-containing phosphor paste composition of Example 6 exhibited a higher tan δ value than the dispersant-free phosphor paste composition of Comparative Example 9. This result shows that the phosphor paste composition of Example 6 has better dispersibility than the phosphor paste composition of Comparative Example 9.

Experimental Example 3

Measurement of Dynamic Viscosities of Phosphor Paste Compositions (Dispersibility Evaluation)

Figure 11:
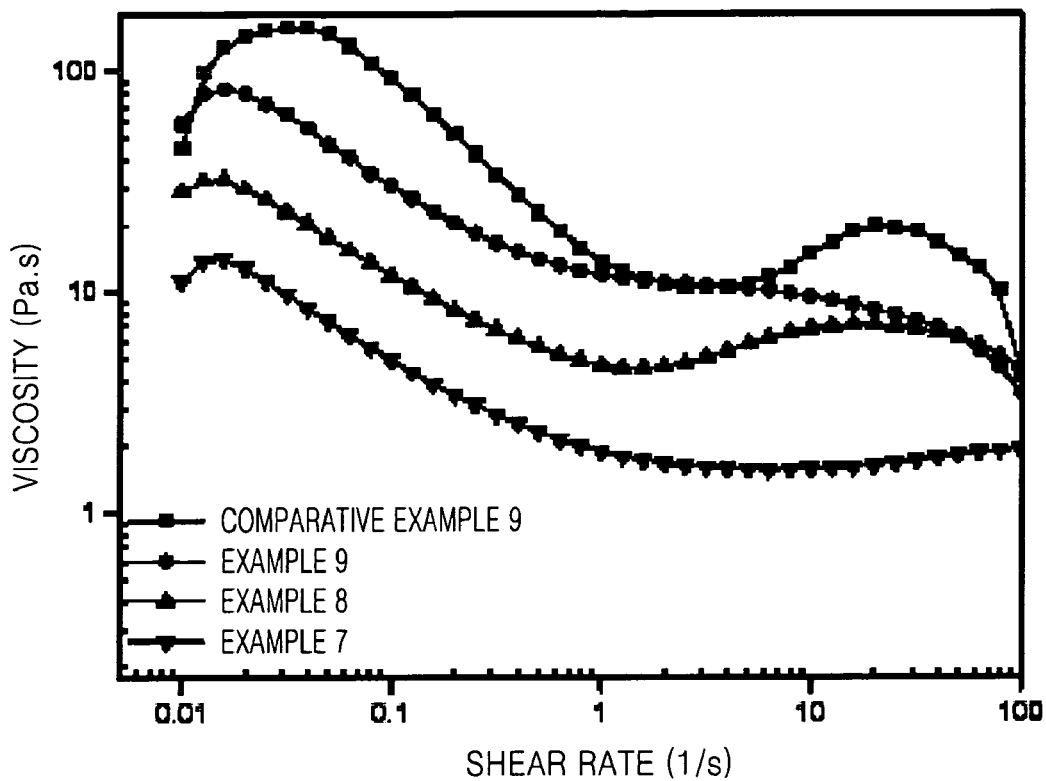
FIG. 11 is a graph illustrating the dynamic viscosities of paste compositions prepared in Examples 7-9 and Comparative Example 9.

The dynamic viscosities of the phosphor paste compositions prepared in Examples 7-9 and Comparative Example 9 were measured using an AR 200 viscometer (TA Instruments, Inc.) and a 60 mm cone-type spindle at 25° C. to evaluate the dispersibility of the phosphor paste compositions, and the experimental results are shown in FIG. 11.

The dynamic viscosities of the phosphor paste compositions prepared in Example 7 and Comparative Examples 9, and 10-13 were also measured in the same manner as above. The experimental results are shown in FIG. 12.

Referring to FIG. 11, as the size of the ethylene oxide group in a dispersant was increased, the viscosity of the corresponding paste composition prepared therefrom was rapidly reduced. This result is attributed to a solubility difference between the dispersant and ethylcellulose used as a dispersion medium.

Figure 12:
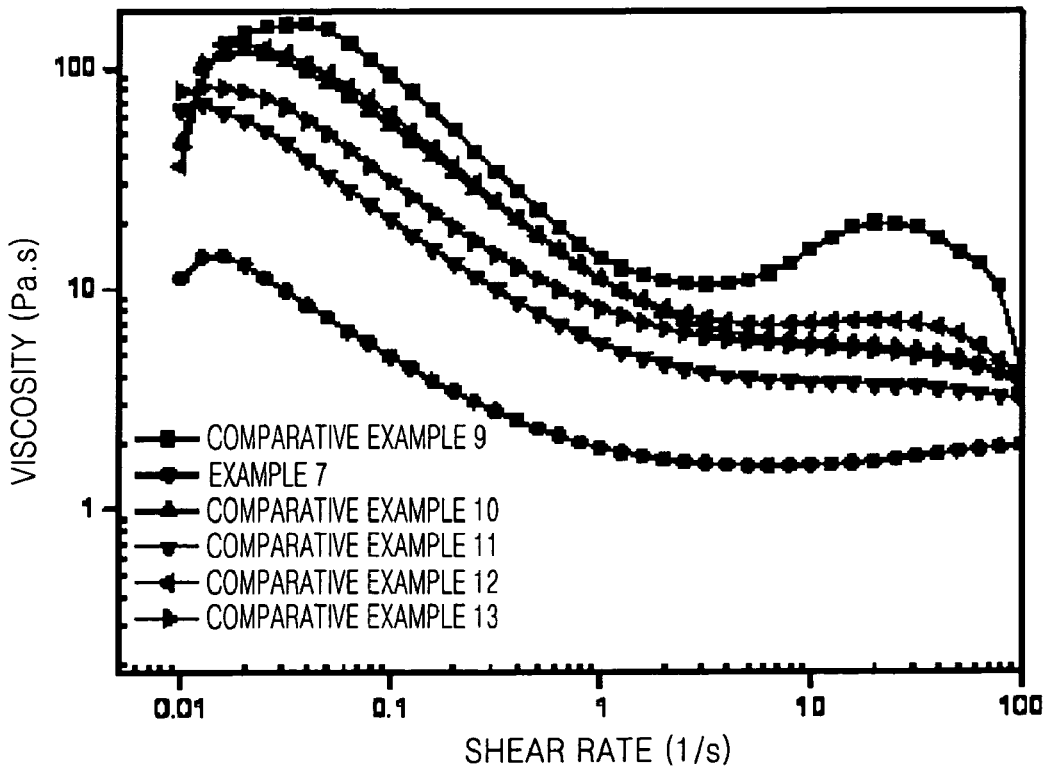
FIG. 12 is a graph illustrating the dynamic viscosities of paste compositions prepared in Example 7 and Comparative Examples 9-13.

Referring to FIG. 12, the phosphor paste composition of Example 7 according to the present invention exhibited a lower viscosity than the phosphor paste compositions of Comparative Examples 9 and 10-13. Such a low viscosity of the phosphor paste composition of Example 7 is attributed to the structure of a dispersant with a hydrophilic moiety having an ethylene oxide group and a carboxylic acid group and a hydrophobic moiety having an alkyl group and an aryl group.

Experimental Example 4

Figure 13:
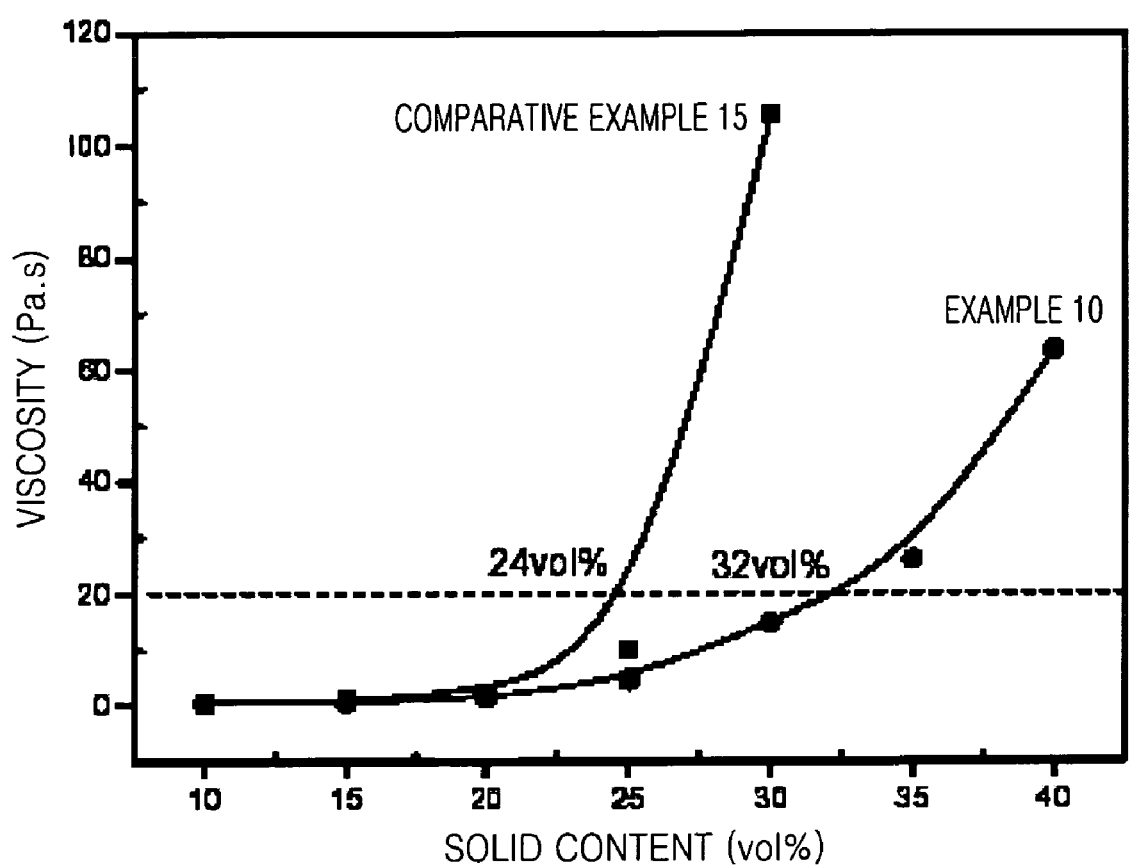
FIG. 13 is a graph illustrating the dynamic viscosities of paste compositions prepared in Example 10 and Comparative Example 15.

Measurement of Viscosities of Phosphor Paste Compositions with Respect to Solid Content The viscosities of the phosphor paste compositions prepared in Example 10 and Comparative Example 15 were measured in the same manner as in Experimental Example 1, and the results are shown in FIG. 13.

Referring to FIG. 13, the viscosities of the phosphor paste compositions of Example 10 and Comparative Example 15 were increased with an increase of a solid content. However, the viscosity of the phosphor paste composition of Example 10, when the solid content was 32 vol %, was increased to 20 Pa·s, which was a level suitable for screen printing, whereas the phosphor paste composition of Comparative Example 15, when the solid content was 24 vol %, reached the same viscosity level as the phosphor paste composition of Example 10. This result shows that a phosphor paste slurry including a dispersant can include more phosphor particles than a conventional phosphor paste slurry having the same viscosity as the phosphor paste slurry of the present invention.

Experimental Example 5

Evaluation of Microstructures of Phosphor Layers Formed by Sintering Phosphor Paste Compositions The phosphor paste compositions prepared in Example 11 and Comparative Example 16 were coated on substrates using a coater (BYK gardner) to form phosphor layers. The phosphor layers were sintered at 480° C. for 30 minutes. The microstructures of the sintered phosphor layers were observed using a scanning electron microscope (SEM, Hitachi S-4200). The results are shown in FIGS. 14A-14B and 15A-15B.

Figure 14A:
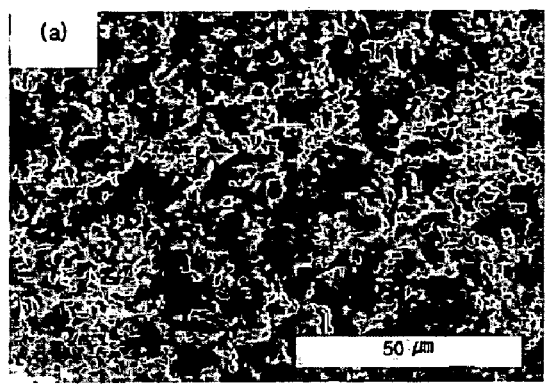
FIGS. 14A and 15A are Scanning Electron Microscopic (SEM) images of a paste composition prepared in Comparative Example 16.
Figure 14B:
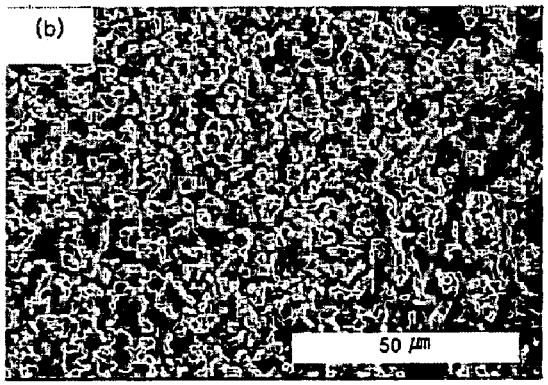
FIGS. 14B and 15B are SEM images of a paste composition prepared in Example 11.
Figure 15A:
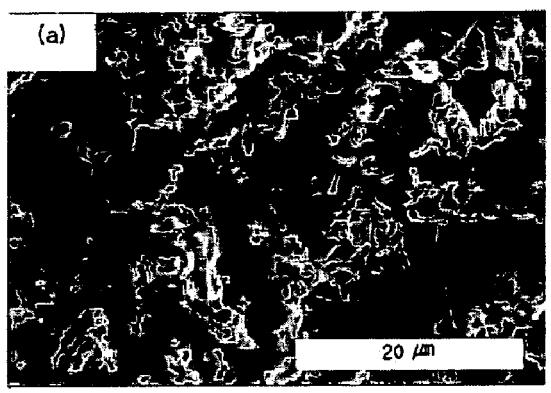
Figure 15B:
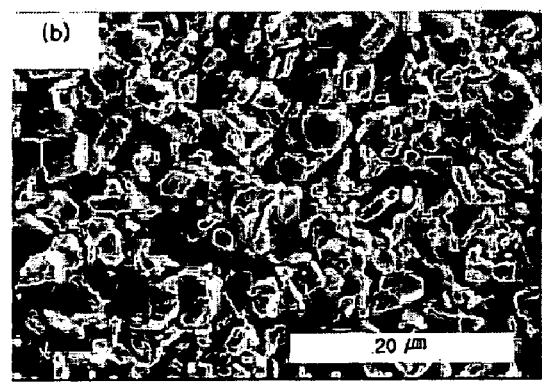

Referring to FIGS. 14A and 15A, the phosphor layers formed by sintering the phosphor paste composition prepared in Comparative Example 16 exhibited a rough surface and a low packing factor due to poor dispersibility. In contrast, referring to FIGS. 14B and 15B, the phosphor layers formed by sintering the phosphor paste composition of Example 11 exhibited a smooth surface and a high packing factor due to good dispersibility.

Experimental Example 6

Measurement of Residual Carbon Content

The dispersant prepared in Example 1 and the commonly available dispersants of Comparative Examples 1 and 3 were heated at a rate of 10° C./min under an $N_2$ atmosphere using a thermogravimetric analyzer (Hi-Res TGA 2950, TA instruments, Inc.), and the weight change of the dispersant samples was measured. The results are presented in Table 3 below.

TABLE 3

| Sample | Residual carbon content (%) at 600° C. |
| --- | --- |
| Example 1 | 1.37 |
| Comparative Example 1 | 9.98 |
| Comparative Example 3 | 3.83 |

As presented in Table 3, the dispersant of Example 1 exhibited the lowest residual carbon content (i.e., more than 2%). On the other hand, the dispersant (phosphate-based dispersant) with good dispersibility of Comparative Example 1 exhibited about 10% residual carbon content, which renders the practical application of the dispersant difficult. The dispersant of Comparative Example 3 also exhibited a higher residual carbon content than the dispersant of Example 1. Such a low residual carbon content of a dispersant is attributed to the carbonization, decomposition, and evaporation of a branched alkyl group and an arylene group of a hydrophobic moiety and an alkylene oxide group and a carboxylic acid group of a hydrophilic moiety. The results of Table 3 are specifically shown in FIGS. 7-9. Thus, barrier ribs made of a glass paste composition including the dispersant of Example 1 can exhibit a smaller residual carbon content and a better packing density than conventional barrier ribs.

Figure 7:
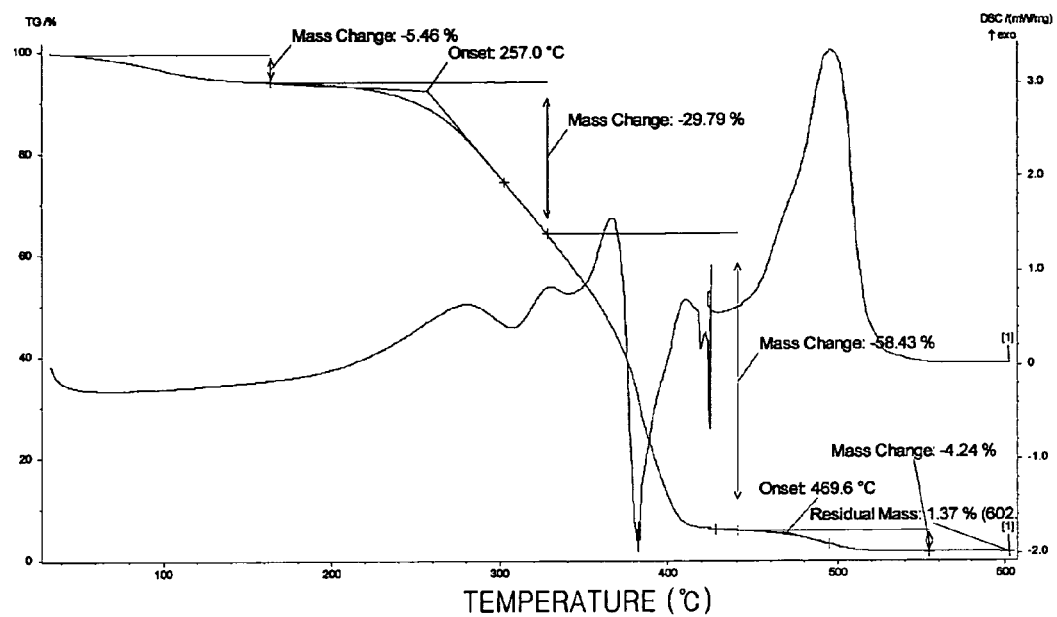
FIGS. 7 through 9 are graphs illustrating the ThermoGravimetric Analysis (TGA) results for dispersants prepared in Example 1 and Comparative Examples 1 and 3, respectively.
Figure 8:
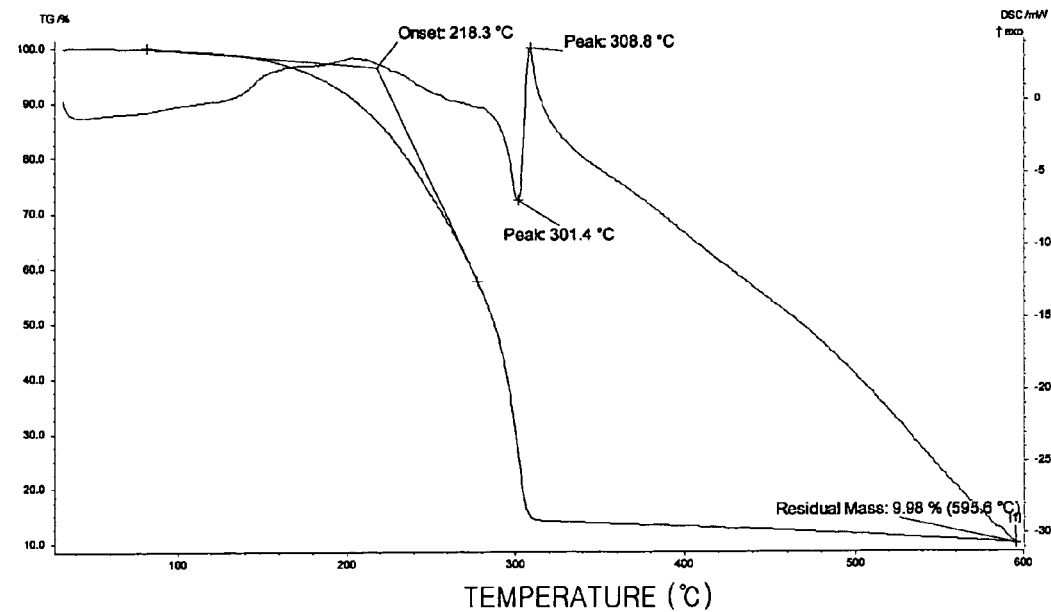
Figure 9:
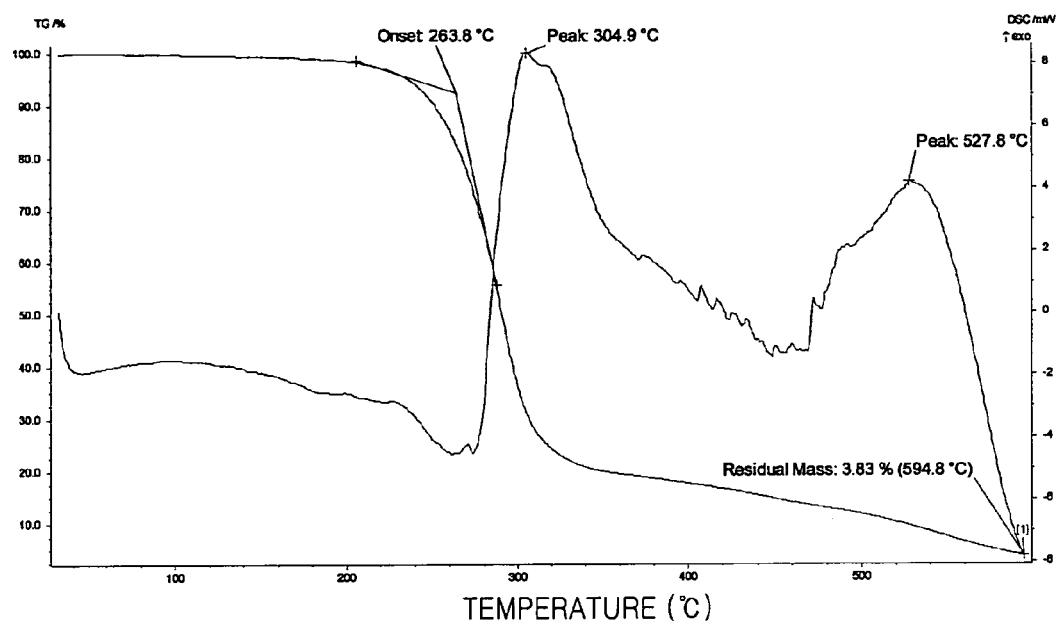

FIGS. 7 and 8 show the TGA results of the dispersant of Example 1 according to the present invention and the commonly available phosphate-based dispersant of Comparative Example 1, respectively. Referring to FIGS. 7 and 8, the phosphate-based dispersant of Comparative Example 1 exhibited a residual carbon content of 9.98% by weight at a sintering temperature of 500° C. or more, whereas the dispersant of Example 1 exhibited a residual carbon content of 1.37% by weight at a sintering temperature of 500° C. or more. These results show that a dispersant has a remarkably reduced carbon content.

Experimental Example 7

Measurement of Photoluminescence (PL) Efficiency

The phosphor paste compositions prepared in Example 11 and Comparative Example 16 were printed on glass substrates and sintered under the same conditions as in Experimental Examples 5. The PL intensities of resultant phosphors were measured using a spectrofluorometer (ISS PCI, ISS Inc.), and the results are shown in FIG. 16.

Figure 16:
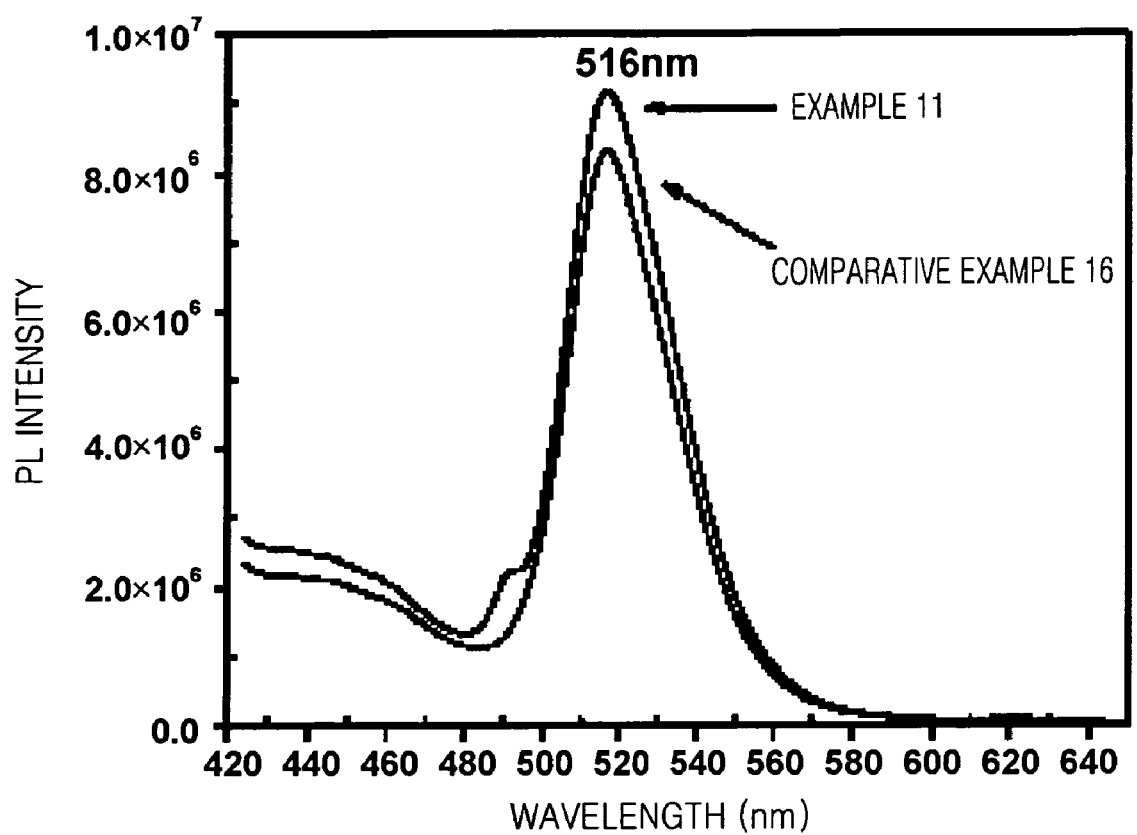
FIG. 16 is a graph illustrating the PhotoLuminescence (PL) efficiencies of phosphors prepared using the paste compositions of Example 11 and Comparative Example 16.

Referring to FIG. 16, the phosphors were excited at a UV wavelength of 410 nm and exhibited a strong PL intensity at 516 nm. The PL intensity of the phosphors obtained by sintering the phosphor paste composition of Example 11 was 10.23% higher than that of the phosphors obtained by sintering the phosphor paste composition of Comparative Example 16. The PL enhancement is attributed to uniform and dense packing of phosphor particles.

A dispersant having a hydrophobic moiety having a branched alkyl tail and arylene group, and a hydrophilic moiety having an alkylene oxide terminating in a carboxylic acid group, has good dispersibility and a low residual carbon content after sintering. Thus, a paste composition including the dispersant can maintain a low viscosity and disperse many inorganic particles. An inorganic device made of the paste composition can therefore also have a low residual carbon content and a high packing density.

What is claimed is:

1. A paste composition comprising:
   inorganic particles, wherein the inorganic particles are a glass powder;
   24-80 parts by weight an organic solvent, based on 100 parts by weight of the inorganic particles; and
   0.5-3 parts by weight of a dispersant based on 100 parts by weight of the inorganic particles, the dispersant comprising:
   a hydrophobic moiety comprising a branched alkyl group and an arylene group; and
   a hydrophilic moiety comprising an alkylene oxide group and a carboxylic acid group,
   wherein the alkyl group is a substituted or unsubstituted alkyl group of 5-30 carbon atoms, the arylene group is a substituted or unsubstituted arylene group of 6-30 carbon atoms, and the alkylene oxide group is a substituted or unsubstituted alkylene oxide group of 2-10 carbon atoms,
   wherein the dispersant is represented by Formula 3 below:

(Formula 3)

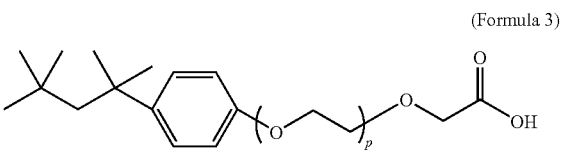

wherein p is 3 to 10.

2. The paste composition of claim 1, wherein the organic solvent is at least one selected from the group consisting of terpineol, butyl carbitol, butyl carbitol acetate, pentene diol, dipentene, limonene, ethyleneglycol alkylether, diethyleneglycol alkyl ether, ethyleneglycol alkylether acetate, diethyleneglycol alkylether acetate, diethyleneglycol dialkylether acetate, triethyleneglycol alkylether acetate, triethyleneglycol alkylether, propyleneglycol alkylether, propyleneglycol phenylether, dipropyleneglycol alkylether, tripropyleneglycol alkylether, propyleneglycol alkylether acetate, dipropyleneglycol alkylether acetate, tripropyleneglycol alkylether acetate, dimethyl phthalate, diethyl phthalate, and dibutyl phthalate.

3. The paste composition of claim 1, wherein the paste composition further comprises an organic binder.

4. The paste composition of claim 1, wherein the glass powder comprises at least one selected from the group consisting of PbO, BaO, $SiO_2$, $B_2O_3$, $Al_2O_3$, ZnO, $Bi_2O_3$, MgO, $Na_2O$, $K_2O$, $TiO_2$, $ZrO_2$, CuO, and $SnO_2$.

5. The paste composition of claim 3, wherein the organic binder is at least one selected from the group consisting of a cellulose resin, a butyral resin, polyethylene oxide, an acrylate resin, a vinyl resin, and polypropylene carbonate.

6. The paste composition of claim 3, further comprising an additive.

7. The paste composition of claim 3 comprising 3-6 parts by weight of the organic binder, 21-74 parts by weight of the organic solvent, and 0.5-3.0 parts by weight of the dispersant, based on 100 parts by weight of the glass powder.

8. The paste composition of claim 7, further comprising 0.1-3 parts by weight of an additive based on 100 parts by weight of the glass powder.

9. The paste composition of claim 7, wherein the paste composition has a viscosity of 10,000 to 60,000 cps at a temperature of 25° C. and at a shear rate of 1 $sec^{-1}$.

10. A paste composition comprising:
inorganic particles, wherein the inorganic particles include at least one phosphor selected from the group consisting of $YBO_3$:Tb, $BaMg_{10}Al_{17}$:Eu, $YGdBO_3$:Eu, and $ZnSiO_4$:Mn;
24-80 parts by weight an organic solvent, based on 100 parts by weight of the inorganic particles; and
0.5-3 parts by weight of a dispersant based on 100 parts by weight of the inorganic particles, the dispersant comprising:
a hydrophobic moiety comprising a branched alkyl group and an arylene group: and
a hydrophilic moiety comprising an alkylene oxide group and a carboxylic acid group,
wherein the alkyl group is a substituted or unsubstituted alkyl group of 5-30 carbon atoms, the arylene group is a substituted or unsubstituted arylene group of 6-30 carbon atoms, and the alkylene oxide group is a substituted or unsubstituted alkylene oxide group of 2-10 carbon atoms, wherein the dispersant is represented by Formula 3 below:

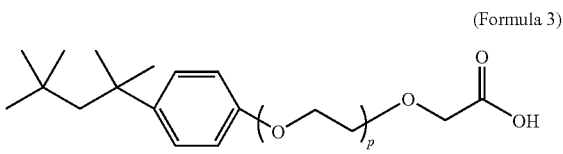

(Formula 3)

wherein p is 3 to 10.

11. The paste composition of claim 10, further comprising an organic binder.

12. The paste composition of claim 10 comprising 3-6 parts by weight of the organic binder, 21-74 parts by weight of the organic solvent, and 0.5-3 parts by weight of the dispersant, based on 100 parts by weight of the phosphor particles.

13. The paste composition of claim 12, further comprising 0.1-3 parts by weight of an additive based on 100 parts by weight of the phosphor particles.

14. A display apparatus prepared using the paste composition of claim 1.

15. The display apparatus of claim 14, wherein the display apparatus is a plasma display panel.

16. The display apparatus of claim 14, wherein the display apparatus is a field emission display.

17. A plasma display panel comprising barrier ribs made of the paste composition of claim 1.

18. The paste composition of claim 10, wherein the organic solvent is at least one selected from the group consisting of terpineol, butyl carbitol, butyl carbitol acetate, pentene diol, dipentene, limonene, ethyleneglycol alkylether, diethyleneglycol alkyl ether, ethyleneglycol alkylether acetate, diethyleneglycol alkylether acetate, diethyleneglycol dialkylether acetate, triethyleneglycol alkylether acetate, triethyleneglycol alkylether, propyleneglycol alkylether, propyleneglycol phenylether, dipropyleneglycol alkylether, tripropyleneglycol alkylether, propyleneglycol alkylether acetate, dipropyleneglycol alkylether acetate, tripropyleneglycol alkylether acetate, dimethyl phthalate, diethyl phthalate, and dibutyl phthalate.

19. A display apparatus prepared using the paste composition of claim 10.

20. The display apparatus of claim 19, wherein the display apparatus is a plasma display panel.

21. The display apparatus of claim 19, wherein the display apparatus is a field emission display.

22. A plasma display panel comprising barrier ribs made of the paste composition of claim 10.

* * * * *